United States Patent
Bayesteh et al.

(10) Patent No.: US 10,447,518 B2
(45) Date of Patent: Oct. 15, 2019

(54) METHODS FOR CONFIGURABLE NON-ORTHOGONAL MULTIPLE ACCESS TRANSMISSION

(71) Applicants: Alireza Bayesteh, Ottawa (CA); Ming Jia, Ottawa (CA); Sanjeewa Herath, Ottawa (CA); Jianglei Ma, Ottawa (CA)

(72) Inventors: Alireza Bayesteh, Ottawa (CA); Ming Jia, Ottawa (CA); Sanjeewa Herath, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/844,015

(22) Filed: Dec. 15, 2017

(65) Prior Publication Data

US 2019/0190753 A1 Jun. 20, 2019

(51) Int. Cl.
*H04L 27/26* (2006.01)
*H04B 1/69* (2011.01)
*H04L 27/36* (2006.01)
*H04J 99/00* (2009.01)

(52) U.S. Cl.
CPC ............ *H04L 27/26* (2013.01); *H04B 1/69* (2013.01); *H04L 27/36* (2013.01); *H04J 15/00* (2013.01)

(58) Field of Classification Search
CPC ...... H04B 1/707; H04B 7/0413; H04L 5/0007
See application file for complete search history.

(56) References Cited

U.S. PATENT DOCUMENTS

| | | | |
|---|---|---|---|
| 6,091,761 A * | 7/2000 | Popovic | H04B 1/707 375/142 |
| 9,166,663 B2 | 10/2015 | Bayesteh et al. | |
| 9,240,853 B2 | 1/2016 | Nikopour et al. | |
| 9,356,748 B2 | 5/2016 | Nikopour et al. | |

(Continued)

FOREIGN PATENT DOCUMENTS

| | | |
|---|---|---|
| CN | 105991490 A | 10/2016 |
| WO | 2016209045 A1 | 12/2016 |

OTHER PUBLICATIONS

"Overview of non-orthogonal multiple access for 5G" (Document for/Discussion and Decision) Huawei, HiSilicon, R1-162153, 3GPP TSG RAN WG1 Meeting #84bis, Busan, Korea, Apr. 11-15, 2016.

(Continued)

*Primary Examiner* — Ross Varndell

(57) ABSTRACT

Aspects of the present disclosure provide a scheme for generating a multiple access (MA) signal that include mapping each of at least one stream of bits to generate a set of modulated symbols and transmitting the set of modulated symbols. The spreading signatures that are selected to map the at least one stream of bits are selected, at least in part, based on a set of compatibility rules. The spreading involves mapping each stream of bits using a respective spreading signature from a set of spreading signatures to generate a respective set of modulated symbols, wherein real spreading signature components of the spreading signatures are orthogonal to each other and imaginary spreading signature components of the spreading signatures are orthogonal to each other.

21 Claims, 9 Drawing Sheets

(56) References Cited

U.S. PATENT DOCUMENTS 9,509,379 B2  11/2016  Taherzadeh Boroujeni et al.
10,136,468 B2*  11/2018  Kimura .............. H04W 72/044

OTHER PUBLICATIONS

"Discussion on multiple access for new radio interface" (Document for/Discussion) ZTE, R1-162226, 3GPP TSG RAN WG1 Meeting #84bis, Busan, Korea, Apr. 11-15, 2016.
"Multiple access schemes for new radio interface" (Document for/Discussion/Decision) Intel Corporation, R1-162385, 3GPP TSG RAN WG1 Meeting #84bis, Busan, South Korea, Apr. 11-15, 2016.
"Considerations on DL/UL multiple access for NR" (Document for/Discussion and decision) LG Electronics, R1-162517, 3GPP TSG RAN WG1 Meeting #84bis, Busan, Korea Apr. 11-15, 2016.
"Initial views and evaluation results on non-orthogonal multiple access for NR uplink" (Document for/Discussion) NTT DOCOMO, INC., R1-163111, 3GPP TSG RAN WG1 Meeting #84bis, Busan, Korea Apr. 11-15, 2016.
"Candidate Solution for New Multiple Access" (Document for/Discussion and Decision) CATT, R1-163383, 3GPP TSG RAN WG1 Meeting #84bis, Busan, Korea Apr. 11-15, 2016.
"Candidate NR Multiple Access Schemes" (Document for/Discuss/Decision) Qualcomm Incorporated, R1-163510, 3GPP TSG-RAN WG1 #84b, Busan, Korea Apr. 11-15, 2016.
"Non-orthogonal Multiple access candidate for NR" (Document for/Discussion and Decision) Samsung, R1-163992, 3GPP TSG RAN WG1 Meeting #85, Nanjing, China, May 23-27, 2016.
"Initial LLS results for UL non-orthogonal multiple access" (Document for/Discussion/Decision) Fujitsu, R1-164329, 3GPP TSG RAN WG1 Meeting #85, Nanjing, China, May 23-27, 2016.
"Low code rate and signature based multiple access scheme for New Radio" (Document for/Discussion / Decision) ETRI, R1-164869, 3GPP TSG-RAN1#85, Nanjing, China, May 23-27, 2016.
"Non-orthogonal multiple access for New Radio" (Document for/Discussion and Decision) Nokia, Alcatel-Lucent Shanghai Bell, R1-165019, 3GPP TSG-RAN WG1#85, Nanjing, P. R. China May 23-27, 2016.
"Performance of Interleave Division Multiple Access (IDMA) in Combination with OFDM Family Waveforms" (Document for/Discussion and Decision) Nokia, Alcatel-Lucent Shanghai Bell, R1-165021, 3GPP TSG-RAN WG1#85, Nanjing, P. R. China, May 23-27, 2016.
"New uplink non-orthogonal multiple access schemes for NR" (Document for/Discussion and decision) MediaTek Inc., R1-167535, 3GPP TSG RAN WG1 Meeting #86, Gothenburg, Sweden Aug. 22-26, 2016.
MediaTek Inc.,"New uplink non-orthogonal multiple access schemes for NR",3GPP TSG RAN WG1 Meeting #86 R1-167535,Gothenburg, Sweden Aug. 22-26, 2016,total 6 pages.
Hyunsoo Kim et al.,"Multiple Access for 5G New Radio:Categorization, Evaluation, and Challenges", arXiv:1703.09042v1 [cs.IT] Mar. 27, 2017,total 9 pages.

* cited by examiner $x = S \cdot (1-2b)$ $x = S \cdot (1-2b)$

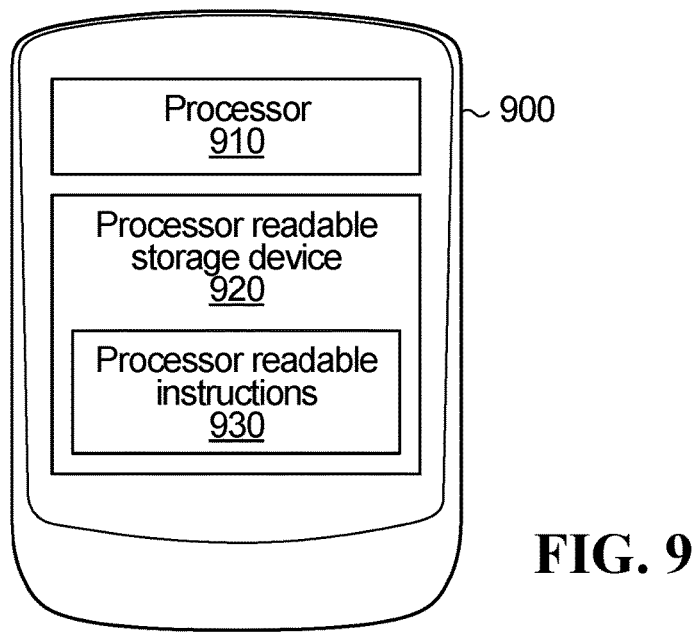
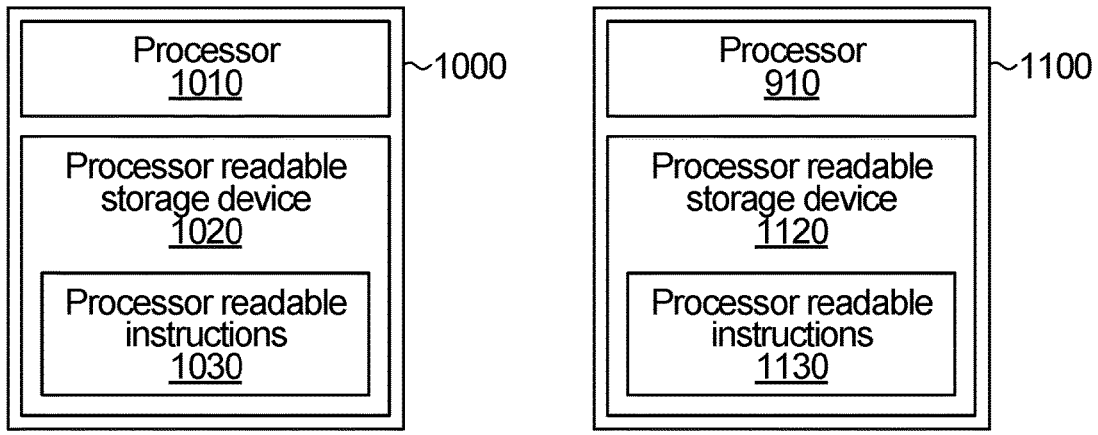
FIG. 9
FIG. 10
FIG. 11

METHODS FOR CONFIGURABLE NON-ORTHOGONAL MULTIPLE ACCESS TRANSMISSION

FIELD

The present disclosure relates generally to communication systems that utilize multiple access (MA) techniques.

BACKGROUND

Multiple access (MA) techniques permit signals being transmitted to multiple user equipments (UEs), or received from multiple UEs, to simultaneously share a transmission resource.

New MA techniques are an active topic for standardization for the next generation of telecommunication technology. There are many proposed MA schemes, with relative benefits and drawbacks in different communication scenarios.

SUMMARY

According to an aspect of the disclosure there is provided a method for transmission of a multiple access (MA) signal involving mapping each of at least one stream of bits to a set of modulated symbols using a set of spreading signatures, wherein the set of spreading signatures is one of a plurality of sets of spreading signatures, wherein for each set of spreading signatures in the plurality of sets, real spreading signature components of the spreading signatures are orthogonal to each other and imaginary spreading signature components of the spreading signatures are orthogonal to each other. The method also involves transmitting the set of modulated symbols as an MA signal.

In some embodiments, the method further involves receiving the plurality of sets of spreading signatures.

In some embodiments, the method further involves receiving an identification of the set of spreading signatures for use in mapping the at least one stream of bits.

In some embodiments, the identification of the set of spreading signatures is one of: a spreading signature set index that identifies the spreading signature set from the plurality of sets of spreading signatures; a first index that identifies a group of sets of spreading signatures from the plurality of sets of spreading signatures; a second index that identifies a spreading signature set from the group of sets of spreading signatures; or a first index that identifies a group of sets of spreading signatures from the plurality of sets of spreading signatures and a second index that identifies a spreading signature set from the group of sets of spreading signatures.

In some embodiments, subsequent to receiving the first index that identifies the group of sets of spreading signatures, selecting the spreading signature set from the group of sets of spreading signatures.

In some embodiments, the identification of the set of spreading signatures is received in a semi-static or dynamic signalling message.

In some embodiments, the method further involves determining the set of spreading signatures to be used for mapping the at least one stream of bits.

In some embodiments, the method further involves transmitting an identification of the set of spreading signatures determined to another device.

In some embodiments, the method further involves determining the set of spreading signatures is based on at least one of: an identifier for the UE; a peak to average power ratio (PAPR); an application type; a transmission type; a transport block size (TBS); a spectral efficiency (SE); a modulation and coding scheme (MCS); a receiver capability; and a key performance indicators (KPI).

In some embodiments, for each set of spreading signatures in the plurality of sets, real spreading signature components of the spreading signatures in the set are real valued components of the spreading signatures and an inner product of the real spreading signature components of two spreading signatures in the set are equal to zero; and imaginary spreading signature components of the spreading signatures in the set are imaginary valued components of the spreading signatures and an inner product of the imaginary spreading signature components of two spreading signatures in the set are equal to zero.

In some embodiments, the set of spreading signatures used for the mapping form a spreading signature matrix and wherein mapping comprises a matrix multiplication of the at least one stream of bits, or a modulated version thereof, and the spreading signature matrix.

In some embodiments, the spreading signature matrix is multiplied by a scrambling matrix.

In some embodiments, the spreading signature matrix is multiplied by a rotation matrix.

In some embodiments, the method further involves mapping the sets of modulated symbols to one or more resource elements prior to transmission.

In some embodiments, for a spreading signature matrix S that is a combination of a matrix $S_r$, which is a matrix of the real components of the spreading signature matrix S, and a matrix $S_i$, which is a matrix of the imaginary components of the spreading signature matrix S, selecting the subset of spreading signatures so that columns of $S_r$ are orthogonal to each other and columns of $S_i$ are orthogonal to each other.

According to an aspect of the disclosure there is provided a user equipment (UE) including a processor and a computer readable storage medium storing programming instructions for execution by the processor. The programming includes instructions to map each of at least one stream of bits to a set of modulated symbols using a set of spreading signatures, wherein the set of spreading signatures is one of a plurality of sets of spreading signatures, wherein for each set of spreading signatures in the plurality of sets, real spreading signature components of the spreading signatures are orthogonal to each other and imaginary spreading signature components of the spreading signatures are orthogonal to each other. The programming also includes instructions to transmit the set of modulated symbols as an MA signal.

In some embodiments, the programming includes instructions to receive the plurality of sets of spreading signatures.

In some embodiments, the programming includes instructions to receive an identification of the set of spreading signatures for use in mapping the at least one stream of bits.

In some embodiments, the identification of the set of spreading signatures is one of: a spreading signature set index that identifies the spreading signature set from the plurality of sets of spreading signatures; a first index that identifies a group of sets of spreading signatures from the plurality of sets of spreading signatures; a second index that identifies a spreading signature set from the group of sets of spreading signatures; or a first index that identifies a group of sets of spreading signatures from the plurality of sets of spreading signatures and a second index that identifies a spreading signature set from the group of sets of spreading signatures.

In some embodiments, subsequent to receiving the first index that identifies the group of sets of spreading signatures, the programming includes instructions to select the spreading signature set from the group of sets of spreading signatures.

In some embodiments, the identification of the set of spreading signatures is received in a semi-static or dynamic signalling message.

In some embodiments, the programming includes instructions to determine the set of spreading signatures to be used for mapping the at least one stream of bits.

In some embodiments, the programming includes instructions to transmit an identification of the set of spreading signatures determined to another device.

In some embodiments, the programming includes instructions to determine the set of spreading signatures is based on at least one of: an identifier for the UE; a peak to average power ratio (PAPR); an application type; a transmission type; a transport block size (TBS); a spectral efficiency (SE); a modulation and coding scheme (MCS); a receiver capability; and a key performance indicators (KPI).

In some embodiments, for each set of spreading signatures in the plurality of sets, real spreading signature components of the spreading signatures in the set are real valued components of the spreading signatures and an inner product of the real spreading signature components of two spreading signatures in the set are equal to zero; and imaginary spreading signature components of the spreading signatures in the set are imaginary valued components of the spreading signatures and an inner product of the imaginary spreading signature components of two spreading signatures in the set are equal to zero.

In some embodiments, the set of spreading signatures used for the mapping form a spreading signature matrix and wherein mapping comprises a matrix multiplication of the at least one stream of bits, or a modulated version thereof, and the spreading signature matrix.

In some embodiments, the spreading signature matrix is multiplied by a scrambling matrix.

In some embodiments, the spreading signature matrix is multiplied by a rotation matrix.

In some embodiments, the programming includes instructions to map the sets of modulated symbols to one or more resource elements prior to transmission.

In some embodiments, for a spreading signature matrix S that is a combination of a matrix $S_r$, which is a matrix of the real components of the spreading signature matrix S, and a matrix $S_i$, which is a matrix of the imaginary components of the spreading signature matrix S, selecting the subset of spreading signatures so that columns of $S_r$ are orthogonal to each other and columns of $S_i$ are orthogonal to each other.

According to an aspect of the disclosure there is provided a method that involves transmitting an identification of a set of spreading signatures for use in mapping each of at least one stream of bits to a set of modulated symbols using a set of spreading signatures, wherein the set of spreading signatures is one of a plurality of sets of spreading signatures, wherein for each set of spreading signatures in the plurality of sets, real spreading signature components of the spreading signatures are orthogonal to each other and imaginary spreading signature components of the spreading signatures are orthogonal to each other. The method also involves receiving the set of modulated symbols.

In some embodiments, the method further involves determining the set of spreading signatures from the plurality of sets of spreading signatures; and associating the set of spreading signatures with the identification to be transmitted.

In some embodiments, determining the set of spreading signatures is based on at least one of: an average traffic load; a transmission type; a peak to average power ratio (PAPR); an application type; a key performance indicator (KPI); a receiver capability; and a rank of the set of spreading signatures.

In some embodiments, determining the set of spreading signatures is based on at least one of: an identity for a UE; a peak to average power ratio (PAPR); an application type; a transport block size (TBS); a spectral efficiency (SE); a modulation and coding scheme (MCS); a receiver capability; and a key performance indicator (KPI).

In some embodiments, the method further involves transmitting one or more sets of spreading signatures to a UE, a maximum number of the sets of spreading signatures including a number equal to the plurality of sets of spreading signatures.

In some embodiments, the identification of the set of spreading signatures is one of: a spreading signature set index that identifies the spreading signature set from the plurality of sets of spreading signatures; a first index that identifies a group of sets of spreading signatures from the plurality of sets of spreading signatures; a second index that identifies a spreading signature set from the group of sets of spreading signatures; or a first index that identifies a group of sets of spreading signatures from the plurality of sets of spreading signatures and a second index that identifies a spreading signature set from the group of sets of spreading signatures.

In some embodiments, the method further involves receiving an identification of the set of spreading signatures for use in spreading at least one stream of bits.

According to an aspect of the disclosure there is provided a network equipment including a processor and a computer readable storage medium storing programming instructions for execution by the processor. The programming includes instructions to transmit an identification of a set of spreading signatures for use in mapping each of at least one stream of bits to a set of modulated symbols using a set of spreading signatures, wherein the set of spreading signatures is one of a plurality of sets of spreading signatures, wherein for each set of spreading signatures in the plurality of sets, real spreading signature components of the spreading signatures are orthogonal to each other and imaginary spreading signature components of the spreading signatures are orthogonal to each other. The programming also includes instructions to receive the set of modulated symbols.

In some embodiments, the programming includes instructions to determine the set of spreading signatures from the plurality of sets of spreading signatures; and associating the set of spreading signatures with the identification to be transmitted.

In some embodiments, determining the set of spreading signatures is based on at least one of: an average traffic load; a transmission type; a peak to average power ratio (PAPR); an application type; a key performance indicator (KPI); a receiver capability; and a rank of the set of spreading signatures.

In some embodiments, determining the set of spreading signatures is based on at least one of: an identity for a UE; a peak to average power ratio (PAPR); an application type; a transport block size (TBS); a spectral efficiency (SE); a modulation and coding scheme (MCS); a receiver capability; and a key performance indicator (KPI).

In some embodiments, the programming includes instructions to transmit one or more sets of spreading signatures to a UE, a maximum number of the sets of spreading signatures including a number equal to the plurality of sets of spreading signatures.

In some embodiments, the identification of the set of spreading signatures is one of: a spreading signature set index that identifies the spreading signature set from the plurality of sets of spreading signatures; a first index that identifies a group of sets of spreading signatures from the plurality of sets of spreading signatures; a second index that identifies a spreading signature set from the group of sets of spreading signatures; or a first index that identifies a group of sets of spreading signatures from the plurality of sets of spreading signatures and a second index that identifies a spreading signature set from the group of sets of spreading signatures.

In some embodiments, the programming includes instructions to receive an identification of the set of spreading signatures for use in spreading at least one stream of bits.

Other aspects and features of embodiments of the present disclosure will become apparent to those ordinarily skilled in the art upon review of the following description.

BRIEF DESCRIPTION OF THE DRAWINGS

Examples of embodiments of the application will now be described in greater detail with reference to the accompanying drawings.

FIG. 9 is a block diagram of an example user equipment (UE) for transmitting a MA signal according to an aspect of the application.

FIG. 10 is a block diagram of an example network side receiver for transmitting a MA signal according to an aspect of the application.

FIG. 11 is a block diagram of an example apparatus for receiving a MA signal according to an aspect of the application.

DETAILED DESCRIPTION

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Multiple access (MA) techniques such as non-orthogonal multiple access (NoMA) generally allow multiple signals to be transmitted from one or more transmitters to one or more receivers simultaneously on a given shared resource. The shared resource may include a time resource, a frequency resource, a code resource, a space resource or some combination thereof. In a downlink (DL) scenario, a network (side) device such as a transmit receive point (TRP), also sometimes known as a transmit point (TP), a receive point (RP), an evolved Node B (eNode B or eNB), or an access point, can transmit to multiple separate user equipment (UE). The term "UE" refers to any component (or collection of components) capable of establishing a wireless connection with a network (side) device, such as a mobile station (STA) or other wirelessly enabled devices. In an uplink (UL) scenario, multiple UEs can transmit to a network receiver.

The present disclosure will be described with respect to example embodiments in a specific context. The disclosure may be applied to standards compliant communications systems, such as those that are compliant with Third Generation Partnership Project (3GPP), IEEE 802.11, and the like, technical standards, as well as non-standards compliant communications systems. Generally, the principles described herein may be applied to any system or network that is configured to allow multiple devices, users, or UEs to share transmission resources e.g. using non-orthogonal or multiple access communications.

Figure 1:
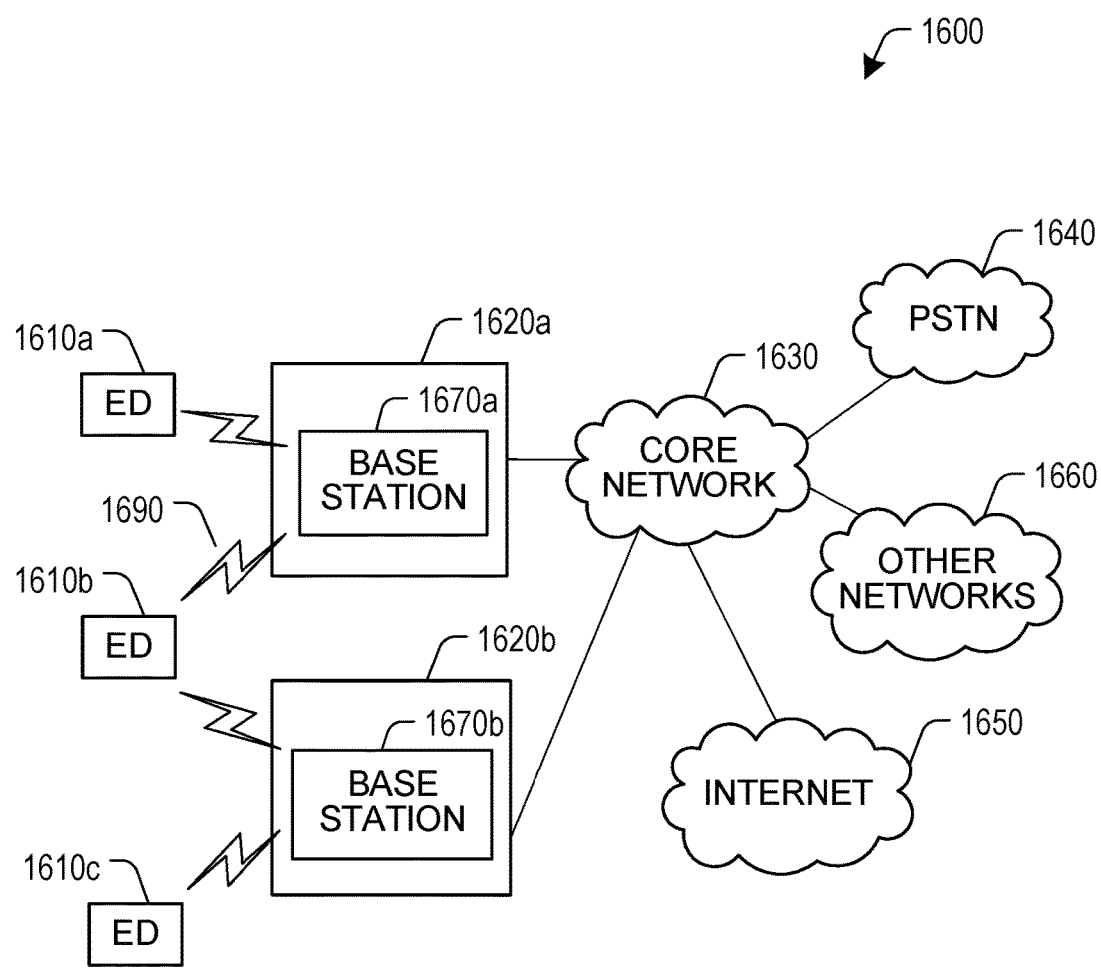
FIG. 1 is a block diagram illustrating a wireless network for communicating data.

FIG. 1 illustrates an example communication system 1600. In general, the system 1600 enables multiple wireless or wired users to transmit and receive data and other content. The system 1600 is configured to support non-orthogonal or multiple access communications and may implement one or more other channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 1610a-1610c, radio access networks (RANs) 1620a-1620b, a core network 1630, a public switched telephone network (PSTN) 1640, the Internet 1650, and other networks 1660. While certain numbers of these components or elements are shown in FIG. 1, any number of these components or elements may be included in the system 1600.

The EDs 1610a-1610c are configured to operate and/or communicate in the system 1600. For example, the EDs 1610a-1610c are configured to transmit and/or receive via wireless or wired communication channels. Each ED 1610a-1610c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1620a-1620b here include base stations 1670a-1670b, respectively. Each base station 1670a-1670b is configured to wirelessly interface with one or more of the EDs 1610a-1610c (which may also be referred to as UEs 1610a to 1610c herein) to enable access to the core network 1630, the PSTN 1640, the Internet 1650, and/or the other networks 1660. For example, the base stations 1670a-1670b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1610a-1610c are configured to interface and communicate with the internet 1650 and may access the core network 1630, the PSTN 1640, and/or the other networks 1660.

In the embodiment shown in FIG. 1, the base station 1670a forms part of the RAN 1620a, which may include other base stations, elements, and/or devices. Also, the base station 1670b forms part of the RAN 1620b, which may include other base stations, elements, and/or devices. Each base station 1670a-1670b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1670a-1670b communicate with one or more of the EDs 1610a-1610c over one or more air interfaces 1690 using wireless communication links. The air interfaces 1690 may utilize any suitable radio access technology.

It is contemplated that the system 1600 may use multiple channel access functionality, including such schemes as described above. In particular embodiments, the base stations and EDs implement LTE, LTE-A, LTE-B, and/or other $4^{th}$ Generation or $5^{th}$ Generation (e.g. New Radio) Radio Access Technologies and wireless protocols. Of course, other multiple access schemes, RATs and/or wireless protocols may be utilized.

Sparse-code multiple access (SCMA) is one example of a (non-orthogonal) multiple access scheme that can be used by EDs 1610a-1610c and/or base stations 1670a-1670b for uplink communications (e.g. from EDs 1610a-1610c to base stations 1670a-1670b) or for downlink communications (e.g. from base stations 1670a-1670b to EDs 1610a-1610c). In SCMA, coded bits are mapped to multi-dimensional codewords (each a sequence of symbols) are selected from codebooks assigned to different layers, users or UEs). Instead of mapping coded bits to QAM symbols and repeating the same QAM symbols over multiple tones, as in CDMA and/or low density signature (LDS), the coded bits are directly mapped to the multi-dimensional codewords. However, SCMA is just one example. Other multiple access schemes may be used in the system 1600, and transmissions may be multiplexed in a domain different than a code domain (e.g. power, time, frequency, space, etc.). Various system parameters such as a modulation order, spreading factor, sparsity, a (maximum) number of allowed multiplexed layers and/or assigned spreading/sparsity sequences or codebook(s) may be used in the base stations 1670a-1670b or in EDs 1610a-1610c (e.g. as signaled by the EDs 1610a-1610c), to activate or enable multiple access transmissions (e.g. uplink or downlink) in system 1600.

The RANs 1620a-1620b are in communication with the core network 1630 to provide the EDs 1610a-1610c with voice, data, application, Voice over Internet Protocol (VoIP), or other services. Understandably, the RANs 1620a-1620b and/or the core network 1630 may be in direct or indirect communication with one or more other RANs (not shown). The core network 130 may also serve as a gateway access for other networks (such as the PSTN 1640, the Internet 1650, and the other networks 1660). In addition, some or all of the EDs 1610a-1610c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1650.

Although FIG. 1 illustrates one example of a communication system, various changes may be made to FIG. 1. For example, the communication system 1600 could include any number of EDs, base stations, networks, or other components in any suitable configuration.

Figure 2A:
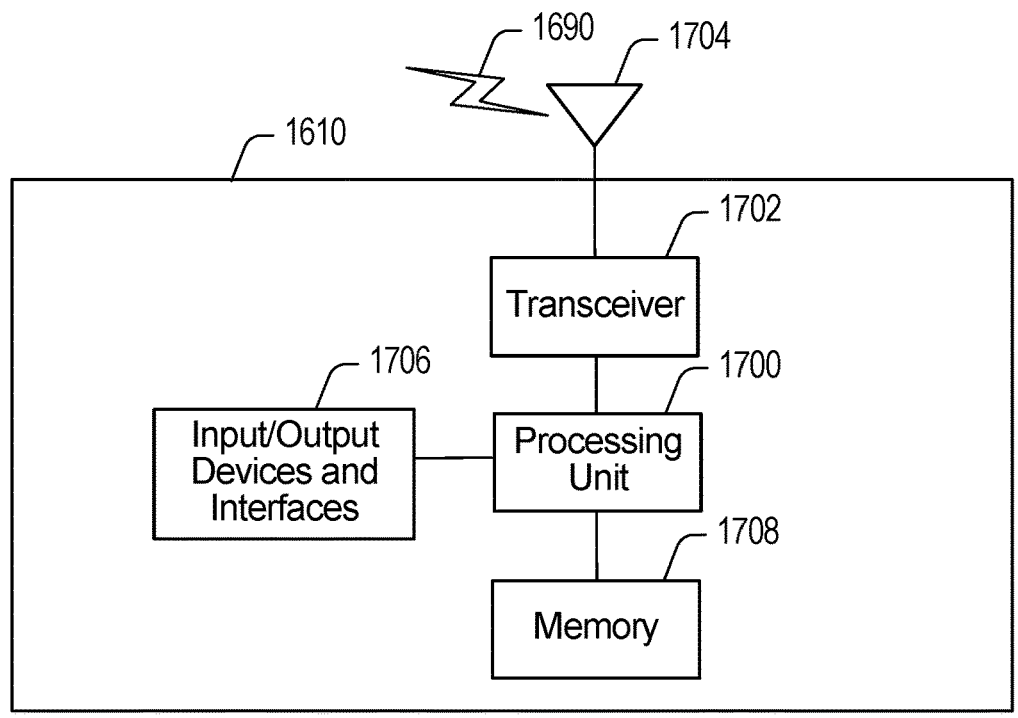
FIG. 2A is a block diagram illustrating an example Electronic Device (ED) structure according to FIG. 1.
Figure 2B:
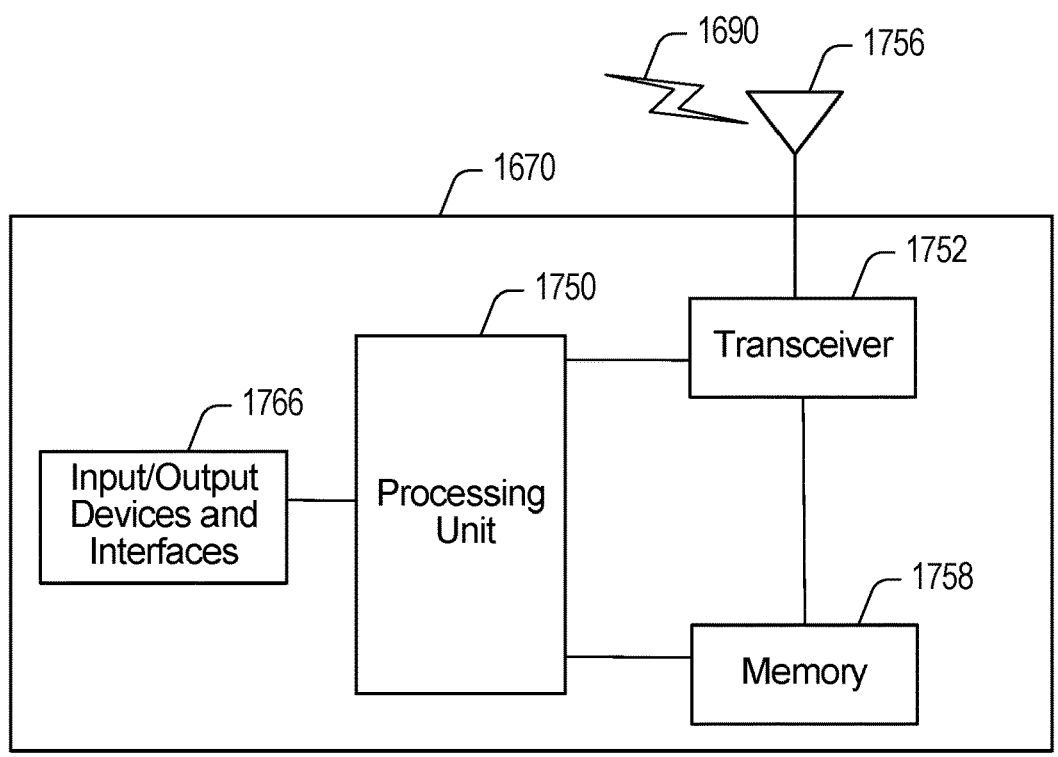
FIG. 2B is a block diagram illustrating an example base station structure according to FIG. 1.

FIGS. 2A and 2B illustrate example devices that may implement the methods and teachings according to this disclosure. In particular, FIG. 2A illustrates an example ED 1610, and FIG. 2B illustrates an example base station 1670. These components could be used in the system 100 or in any other suitable system.

As shown in FIG. 2A, the ED 1610 includes at least one processing unit 1700. The processing unit 1700 implements various processing operations of the ED 1610. For example, the processing unit 1700 may be configured to perform functions and/or the embodiments described in more detail below (e.g. as shown and described in connection with FIGS. 3-5, 7A-B, 9-11). In addition, the processing unit 1700 may be configured to perform signal coding, data processing, power control, input/output processing, or any other functionality enabling the ED 1610 to operate in the system 1600. Each processing unit 1700 includes any suitable processing or computing device configured to perform one or more operations. Each processing unit 1700 could, for example, include a microprocessor, microcontroller, digital signal processor, field programmable gate array, or application specific integrated circuit. While only a single processing unit is shown in FIG. 2A, there could be multiple processing units within ED 1610 performing the above described operations.

The ED 1610 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless or wired transmission and/or processing signals received wirelessly or by wire. Each antenna 1704 includes any suitable structure for transmitting and/or receiving wireless or wired signals. One or multiple transceivers 1702 could be used in the ED 1610, and one or multiple antennas 1704 could be used in the ED 1610. Although shown as a single functional unit, a transceiver 1702 could also be implemented using at least one transmitter and at least one separate receiver.

The ED 1610 further includes one or more input/output devices 1706 or interfaces (such as a wired interface to the internet 1650). The input/output devices 1706 facilitate interaction with a user or other devices (network communications) in the network. Each input/output device 1706 includes any suitable structure for providing information to or receiving/providing information from a user, such as a speaker, microphone, keypad, keyboard, display, or touch screen, including network interface communications.

In addition, the ED 1610 includes at least one memory 1708. The memory 1708 stores instructions and data used, generated, or collected by the ED 1610. For example, the memory 1708 could store software or firmware instructions executed by the processing unit(s) 1700 and data used to reduce or eliminate interference in incoming signals. Each memory 1708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

In some implementations, the functionality of the ED 1610 described herein may be fully or partially implemented in software or modules that is, e.g., stored in the memory 1708 and executed by the processing unit 1700. In yet other implementations, a computer program including instructions which, when executed by at least one processor (processing unit 1700), causes the at least one processor to carry out the functionality of the ED 1610 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

As shown in FIG. 2B, the base station 1670 includes at least one processing unit 1750, at least one transceiver 1752, which includes functionality for a transmitter and a receiver, one or more antennas 1756, at least one memory 1758, and one or more input/output devices or interfaces 1766. A scheduler 1753, which would be understood by one skilled in the art, is coupled to the processing unit 1750. The scheduler 1753 could be included within or operated separately from the base station 1670. The processing unit 1750 is configured to perform functions and/or the embodiments described in more detail below (e.g. as shown and described in connection with FIGS. 3-6, 8, 9-11). In addition, the processing unit 1750 may be configured to implements various processing operations of the base station 1670, such as signal coding, data processing, power control, input/output processing, or any other functionality. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transceiver 1752 includes any suitable structure for generating signals for wireless or wired transmission to one or more EDs or other devices. Each transceiver 1752 further includes any suitable structure for processing signals received wirelessly or by wire from one or more EDs or other devices. Although shown combined as a transceiver 1752, a transmitter and a receiver could be separate components. Each antenna 1756 includes any suitable structure for transmitting and/or receiving wireless or wired signals. While a common antenna 1756 is shown here as being coupled to the transceiver 1752, one or more antennas 1756 could be coupled to the transceiver(s) 1752, allowing separate antennas 1756 to be coupled to the transmitter and the receiver if equipped as separate components. Each memory 1758 includes any suitable volatile and/or non-volatile storage and retrieval device(s). Each input/output device 1766 facilitates interaction with a user or other devices (network communications) in the network. Each input/output device 1766 includes any suitable structure for providing information to or receiving/providing information from a user, including network interface communications.

In some embodiments, the ED 1610 and/or base station 1670 may each include only a subset of the components shown in FIGS. 2A and 2B to perform the operations described herein. For example, the EDs 1610, 1670 may only include a processing unit 1700, 1750 or a processing unit 1700, 1750 coupled with a memory 1708, 1758. In those embodiments, EDs 1610, 1670 may also include an interface or communication module to enable wireless communications with other devices in the network. Although not shown, the interface or communication module could include a modulator, an amplifier, antenna and/or other modules or components of a transmit chain or alternatively could be configured to interface with a separate (Radio-Frequency—RF) communication module. For example, either or both of the processing unit 1700, 1750 and memory 1708, 1758 of the EDs 1610, 1670 may be implemented in hardware or circuitry (e.g. in one or more chipsets, microprocessors, application-specific integrated circuits (ASIC), field-programmable gate arrays (FPGAs), dedicated logic circuitry, or combinations thereof) so as to produce Multiple Access (MA) signals as described herein for transmission by a separate (RF) unit.

In some implementations, the functionality of the ED 1610 and/or base station 1670 described herein may be fully or partially implemented in software or modules that is, e.g., stored in a memory and executed by a processing unit. In yet other implementations, a computer program including instructions which, when executed by at least one processor (or processing unit), causes the at least one processor to carry out the functionality of the ED 1610 or base station 1670 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 3:
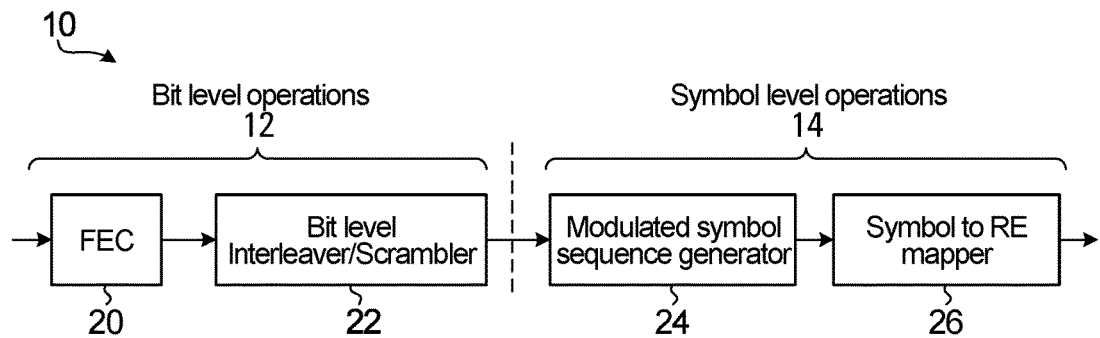
FIG. 3 is a block diagram illustrating an example of an apparatus that could be used in implementing a non-orthogonal multiple access (NoMA) scheme.

Embodiments disclosed herein could be applied in multiple access scenarios, including but not in any way limited to NoMA, for example. FIG. 3 is a block diagram illustrating an example of an apparatus that could be used in implementing a NoMA scheme.

FIG. 3 illustrates an example of an apparatus 10 implementing a collection of signal processing operations that may be part of a framework for generating a NoMA signal, which includes units to function as a FEC encoder 20, a bit-level interleaver/scrambler 22, a modulated symbol sequence generator 24, and a symbol to RE mapper 26. Bit-level operations and symbol-level operations are also labelled at 12, 14, respectively, in FIG. 3.

A stream of information bits is provided to the FEC encoder 20 to perform forward error correction (FEC) encoding. The information bits are processed with a FEC channel code, which could be a low density parity check (LDPC) code, a Turbo code, a polar code, or another type of code. In one embodiment, a block of K information bits is encoded and N>K coded bits are generated.

The encoded bits are then provided to bit-level interleaver/scrambler 22 for bit-level interleaving/scrambling. In the bit-level interleaver/scrambler 22, the coded bits are interleaved and/or scrambled, and interleaved/scrambled bits are generated. The bit-level interleaver/scrambler 22 could be user- (or receiver) specific, such that each user or receiver is associated with a specific interleaver/scrambler sequence or scheme, or is associated with a cell-specific interleaver/scrambler sequence, such that a specific interleaver/scrambler sequence or scheme is applied for receivers in each cell or service area in a network. In some embodiments, other bit operations may be performed. In other embodiments, the coded bits may be forwarded directly to the modulated symbol sequence generator 24 (i.e. no interleaving or scrambling is applied to the coded bits).

In the example shown in FIG. 3, an output of coded bits from the bit-level interleaver/scrambler 22 is provided to the modulated symbol sequence generator 24. The modulated symbol sequence generator 24 generates symbols from the coded bits. In the modulated symbol sequence generator 24, the interleaved/scrambled bits are mapped to modulated symbols, with or without symbol-level spreading operations. The bit-to-symbol mapping could be one or multiple bits to one or multiple symbols. Symbol-level spreading could involve multiplying the symbols with spreading codes, which may include one or multiple stages, and the length of spreading code could be different at each stage.

Although not specifically shown in FIG. 3, an output of the modulated symbol sequence generator 24 could be provided to a symbol sequence precoder that performs symbol precoding. Such precoding could be intended to reduce the peak to average power ratio (PAPR) of a transmitted signal, which may improve coverage of the transmitted signal. In the case of an OFDM waveform, discrete Fourier transform (DFT) precoding might be used.

A symbol sequence, which may have been precoded in some embodiments, is provided to the symbol to resource element (RE) mapper 26. The modulation symbols are mapped to resource elements for transmission, with or without symbol-level interleaving/scrambling. A symbol-level interleaver/scrambler could be user-specific, such that each user has a specific symbol-level interleaver/scrambler sequence or scheme, or cell-specific, with a specific symbol-level interleaver/scrambler sequence or scheme being applied for the receiver in each cell or coverage area of a network. In some embodiments, a symbol sequence precoder can also be used after the symbol to resource element (RE) mapper.

Other operations or features could also be implemented. For example, a waveform modulator could be implemented to generate, after the symbols have been mapped the REs, the actual signal to be transmitted over the air.

According to the framework illustrated in FIG. 3, information bits are first encoded using a FEC encoder, and bit-level interleaving/scrambling or other bit level operation may be applied to coded bits which can be cell-specific, UE-specific, or in general layer-specific, in the case that MA signal transmitted from a UE contains multiple layers. These are bit-level operations. UE-specific, or more generally layer-specific, symbol-level operations including modulated symbol sequence generation and symbol-to RE mapping are applied. Such a framework may assist a receiver in decoding signals of multiplexed receivers more efficiently.

Devices configured to transmit data, which can be either network (side) devices, such as base stations and access points, or mobile devices (e.g. UEs), may use or be assigned different signatures to help a receiver discriminate transmissions at the receiving end. When different signatures are used, different bit and/or symbol sequences may be generated from the same set of input bits. In that sense, a signature assigned to a device becomes associated with and/or uniquely identifies the particular set of bit or symbol sequences produced by that device. The signature may alternatively be associated with or uniquely identify, or both, the particular bit domain or symbol domain or combination of bit and symbol domains operation(s) used by a device to produce the bit/symbol sequences. The signature may also be alternatively associated with or uniquely identify, or both, particular module(s) or generator(s) (in bit domain or symbol domain or combination thereof) used to produce bit/symbol sequences. Other possibilities exist for associating signatures to transmitting devicees.

FIG. 3 is intended solely as an illustrative example showing both bit and symbol level operations.

NoMA generally allows multiple signals to be transmitted from one or more transmitters to one or more receivers simultaneously on a given shared resource. The shared resource may include a time resource, a frequency resource, a code resource, a space resource or some combination thereof. In a downlink (DL) scenario, a network side device can transmit to multiple separate user equipments (UEs). In an uplink (UL) scenario multiple UEs can transmit to a network (side) receiver.

In the UL NoMA scenario, the UEs process information bits arranged in one or more layers to become symbols for transmission on multiple tones. In NoMA, there are likely to be collisions of symbols from the multiple UEs at the receiver that receives the signals. A NoMA technique may attempt to distinguish the transmitted signals from the multiple UEs by applying some UE specific (and/or user-specific) or layer-specific features using MA signatures that are unique to the UE or layer, respectively.

Distinct multiple access schemes can be developed based on such UE-specific (and/or user-specific) or layer specific (or both) features or signal processing operations. These signal processing operations may include, but are not limited to: FEC, bit-level interleaving/scrambling; modulated symbol sequence generator; and symbol to RE mapping.

Figure 4A:
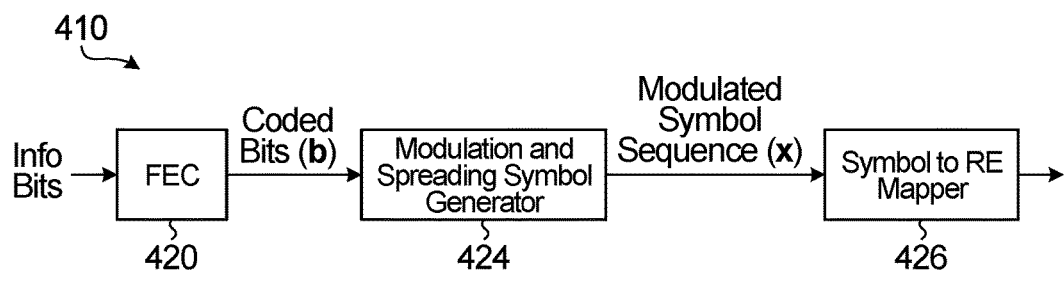
FIG. 4A is block diagram illustrating an example of an apparatus that could be used in implementing a non-orthogonal multiple access (NoMA) scheme according to an aspect of the disclosure.

FIG. 4A illustrates an example apparatus 410 implementing a framework for generating a NoMA signal, which includes units to function as a FEC encoder 420, a modulation and spreading symbol generator 424, and a symbol to RE mapper 426. The output of the FEC encoder 420 is coded bits b. The output of the modulation and spreading symbol generator 424 is a modulated symbol sequence x. Modulation performed by the modulation and spreading symbol generator 424 can be Quadrature Amplitude Modulation (QAM) such as Binary Phase Shift Keying (BPSK) or Quadrature Phase Shift Keying (QPSK), but other modulation schemes could be used. When the QAM is BPSK, the modulated symbol sequence x can be expressed as $x=S*(1-2b)$, where S is the modulation and spreading symbol sequence generator. The modulation and spreading symbol sequence generator can be defined by having M (e.g. M≥1) spreading signatures and each signature having N (e.g. N≥1) elements. Such an apparatus may be used for non-sparse symbol sequence generation. A spreading signature corresponds to the MA signature defined above, but specifically for symbol spreading.

A framework is proposed for generating a MA signal based on selection of a set of spreading signatures, which may also be referred to as components, vectors or sequences, from a pool of spreading signatures which may be accessible to a device that is to transmit the MA signal. The selection of spreading signatures form a modulation and spreading symbol sequence generator. Each spreading signature is comprised of a collection of elements.

In some implementations, the modulation and spreading symbol sequence generator may be considered a spreading or mapping matrix, and the spreading signatures may be considered as columns of the matrix. In some other implementations, the spreading signatures may be referred to as spreading sequences or spreading vectors and/or the matrix could be stored in the form of a table. As can be seen from FIG. 4A, an output of the modulation and spreading symbol generator 424 is a result of the coded bits b being mapped or translated into symbols, in the function (1-2b), and the symbols being multiplied by the spreading matrix in a matrix multiplication process to generate the output sequence of symbols x. The spreading matrix can be considered to have M columns and each column having N elements, where M and N can be any integer values. It should be noted that symbol generator 424 may alternatively map the coded bits to a sequence of QAM symbols (using QAM modulation) and then multiply the QAM symbols by a scrambling sequence (cover code) to generate the output sequence of symbols x. In an alternative way, symbol generator 424 may utilize QAM modulation to map the input bits to a sequence of QAM symbols and then use a mapping or spreading matrix to map the QAM symbols to the output sequence of symbols x. Examples of this approach are described in U.S. patent application Ser. No. 15/699,367 filed September 2017 and titled "Method for Multiple Access Transmission" (herein incorporated herein in its entirety). Many other possibilities exist for mapping the coded bits to a sequence of symbols x. Generally, any symbol generator that maps a sequence of bits to a sequence of symbols can be used.

In some embodiments, a device on the network side provides a UE one or more pools of spreading signatures that the UE can select from in order to form the modulation and spreading symbol sequence generator. In some embodiments, the network provides the one or more pools of signatures when the UE access the network, or at some other appropriate time, and the UE stores the pools of signatures for later use. This can be done semi-statically using radio resource control (RRC) or higher layer signaling or based on dynamic signalling from the network. The network can update the one or more pools of signatures after they have been provided to the UE. The one or more pools of spreading signatures can be generated by the network side device or may have been provided to the network side device and stored for later dissemination to UEs as required.

In some embodiments, the UE may be (pre)configured with one or more pools of spreading signatures before it is sold to a user and the (pre)configured one or more pools of spreading signatures are stored for later selection by the UE in generating the modulation and spreading sequence matrix.

In some embodiments, one or more pools of the modulation and spreading symbol sequence generator in the form of spreading matrices are already pre-constructed and either provided to the users when the UE accesses the network or at some other appropriate time, and the UE stores the pools of matrices for later use. There may be a single pool of spreading matrices of the spreading matrices may be grouped into sets of spreading matrices, each group of sets having one or more common properties. This can be done semi-statically using radio resource control (RRC) or higher layer signaling or based on dynamic signalling from the network. The network can update the one or more pools of signatures after they have been provided to the UE.

In some embodiments, the UE may be (pre)configured with one or more pools of spreading matrices before it is sold to a user and the (pre)configured one or more pools of spreading matrices are stored for later selection by the UE e.g. in accordance with some selection criteria.

A UE can select one or more spreading signatures from a pool of spreading signatures that are available for selection to create the modulation and spreading symbol sequence generator. Properties that define the signatures in the pool of signatures may include, but are not limited to, a sparsity factor, a sparsity pattern, and sequence elements.

A UE may also select a spreading matrix from one or more pools of spreading matrices that are available for selection to create the spread modulated symbols. Properties that define spreading matrices in the pool(s), also referred to as groups of sets of spreading matrices, may include, but are not limited to, spreading factor, modulation order, sparsity factor and matrix elements.

Generation of a sparse symbol sequence means generating a set of symbols where at least one of the symbols represents a zero value. The zero value symbol is indicated by a state of the transmission resource(s). In some implementations, a character '0' may be used to indicate a zero value. A zero constellation point (i.e., a constellation symbol with zero power) may for example represent the zero value. Examples of transmission resources may include physical or logical transmission resources such as frequency, time, antenna ports, antenna elements, sub-carriers, REs, beams, frequency bands, etc. A sparsity factor may be defined as a ratio of non-zero resources utilized for data transmission for a given device over the total available resources.

In some implementations, a sparse symbol sequence can be generated by puncturing. At first, a non-sparse symbol sequence of length K is generated and L ($>=1$) elements, where L$>=$N, are punctured based on a desired sparsity pattern to produce a desired sparse symbol sequence of length L.

Alternatively, sparsity can be produced by padding one or more zero symbols to a sequence of symbols and performing symbol level interleaving or scrambling, or both.

The pool of signatures may be divided into groups, wherein each group has one or more properties in common. For example, signatures that are non-sparse may be grouped together or signatures that have the same sparsity factor may be grouped together.

The pool of spreading matrices may be divided into groups, wherein each group has one or more properties in common. For example, matrices in the same group can have the same number of columns or their columns may have the same sparsity factor, or both.

The selection of the spreading signatures can in part be based on a UE identifier (UE ID) and/or one or more transmission or communication parameters as may be received from a network node (e.g. base station 1620*a*, 1620*b*) through RRC signaling, DCI signaling, MAC CE (control element) or any combination thereof. Such communication parameters may include a spectral efficiency (SE), a transport block size (TBS), a peak to average power ratio (PAPR); a modulation and coding scheme (MCS), a receiver capability, a transmission type, an application scenario or type (e.g. eMBB, URLLC, mMTC, etc) or any required key performance indicator (KPI).

Additionally or alternatively, the selection may also be based in part on one or more defined compatibility rules between the selected signatures. In some embodiments, the compatibility rule(s) may include avoiding complex elements in the signatures. This means for example that the individual elements in the signatures have either only a real component or only an imaginary component (i.e. not both). In another embodiment, the compatibility rule(s) may also additionally or alternatively limit the elements of a given signature to be from a given set, e.g. $\{0,1,-1,j,-j\}$ to facilitate the implementation and standardization effort. In yet another embodiment, the compatibility rule(s) may dictate that if there is more than one real or imaginary element in a corresponding element of two selected signatures for the modulation and spreading symbol sequence generator, the two signatures should be orthogonal to each other in both real and imaginary domains. For example, each signature contains two component signatures, i.e. a real component signature and an imaginary component signature. These real and imaginary component signatures can be obtained by considering only the real parts of each signature element in the real component signature and only the imaginary parts of each signature element in the imaginary component signature. Therefore, the compatibility rule(s) implies that both their real component signatures and imaginary component signatures should be orthogonal to each other. The real component signatures of two signatures are orthogonal if the inner product of the real component signatures is equal to zero. Similarly, the imaginary component signatures of two signatures are orthogonal if the inner product of the imaginary component signatures is equal to zero. In some embodiments, orthogonality between real and/or imaginary signature components may help reduce and, in some cases, remove self-interference between the components of the MA signal transmitted (e.g. from the same UE or BS). In other words, violating the orthogonality rule may create self-interference between the components of the MA signal transmitted and may result in performance degradation. However other compatibility rules may be used. For example, another compatibility rule may include that the sum of the powers of the elements of each of the signatures should be equal for all of the signatures of modulation and spreading symbol sequence generator. Generally, the compatibility rules are set to provide a certain level of performance for the NoMA transmission using the selected signatures.

The selection of the signatures from the one or more pools should be performed such that the signatures are compatible with one another according to the rules. Let us assume the signature pool is:

$$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} j \\ 0 \end{bmatrix}, \begin{bmatrix} 0 \\ j \end{bmatrix} \right\}.$$

The signature pool in this example includes six signatures. The first signature is represented as a vector of two real elements. The second signature is represented as a vector of two real elements. The third signature is represented as a vector of one real element and one imaginary element and so on. When a first signature selected by the UE is the first signature of the pool $$\begin{bmatrix} 1 \\ 1 \end{bmatrix},$$

the subset of signatures that could be selected from the pool and still meet the orthogonality rule defined above would be reduced to the second, fifth and sixth signatures $$\left\{ \begin{bmatrix} 1 \\ -1 \end{bmatrix}, \begin{bmatrix} j \\ 0 \end{bmatrix}, \begin{bmatrix} 0 \\ j \end{bmatrix} \right\}$$

as these are the only signatures from the original pool that would be orthogonal to the first signature.

The construction of one or more pools of spreading matrices can be performed in a way that all the matrices in each of the pools satisfy a defined rule. In some embodiments, the rules may include avoiding complex elements in the matrices. This means for example that the individual elements in each column of the matrices have either a pure real component or a pure imaginary component. In some other embodiments, the elements of the matrices can be restricted to be in a given set, e.g. $\{0,1,-1,j,-j\}$. Furthermore, the rules may impose that any given two columns of the matrices should be orthogonal to each other in both the real and imaginary domains. In other words, each column contains two component vectors, i.e. a real component vector and an imaginary component vector. These real and imaginary component vectors can be obtained by considering only the real parts of each element of a given column in the real component vector and only the imaginary parts of each element of the given column in the imaginary component vector. Therefore, this rule implies that, both their real component vectors and imaginary component vectors should be orthogonal to each other. The real component vectors of two columns are orthogonal if the inner product of the real component vectors is equal to zero. Similarly, the imaginary component vectors of two columns are orthogonal if the inner product of the imaginary component vectors is equal to zero. In some embodiments, another rule may include that the sum of the powers of the elements of each of the columns should be equal for all of the columns in the matrix. Generally, the compatibility rules are set to provide a certain performance for the NoMA transmission using the selected spreading matrix. As described above. Once one or more pools of the matrices are selected satisfying the pre-defined rule, as mentioned above, the selection of the spreading matrices can in part be based on an identifier for a UE (UE ID), and/or transmission or communication parameters including spectral efficiency (SE), transport block size (TBS), modulation and coding scheme (MCS), receiver capability, application scenario including required key performance indicators (KPI) and transmission type. For example, for a high TBS, which typically corresponds to a high SE or high MCS, a selection of matrices with larger number of columns is preferable to improve performance. Conversely, for a low TBS (and/or a low SE/MCS), matrices with a smaller number of columns may be preferred. In addition or in the alternative, the receiver capability may also help determine the appropriate spreading matrices to select. For example, matrices with sparse or high sparsity columns (i.e. with a high number of non-zero elements) may be preferable for a simple (i.e. low capability) receiver whereas matrices with non-sparse or low-sparsity columns (i.e. with a low number of non-zero elements) may be preferable for more sophisticated (i.e. high capability) receivers. Additional or other parameters may be used to select matrices.

The following are two examples of matrices representing the modulation and spreading symbol sequence generation that are constructed based on the rules described above. As such, they may be considered "valid". A first modulation and spreading symbol sequence generator matrix $$S = \begin{bmatrix} -\frac{1}{\sqrt{2}} & j & 0 \\ -\frac{1}{\sqrt{2}} & 0 & j \end{bmatrix}$$

is valid since all elements in a given signature are either pure real or pure imaginary. Furthermore, in each corresponding element of the signatures there is only one real and one imaginary non-zero element. The sum of the powers of each of the signatures is also equal. A second modulation and spreading symbol sequence generator matrix $$S = \begin{bmatrix} -\frac{1}{\sqrt{2}} & \frac{1}{\sqrt{2}} & 0 \\ -\frac{1}{\sqrt{2}} & -\frac{1}{\sqrt{2}} & j \end{bmatrix}$$

is also valid, since although the first and second signatures include only the real elements, the signatures are orthogonal in the real/imaginary domain.

The modulation and spreading symbol sequence generator matrix S, which is also referred to as spreading matrix, is comprised of a collection or real and imaginary component values. In some embodiments, it is possible to consider the modulation and spreading symbol sequence generator S as a combination of a matrix $S_r$, comprised of the real components of the modulation and spreading symbol sequence generator S and a matrix $S_i$ comprised of the imaginary components of the modulation and spreading symbol sequence generator S. For example, for the modulation and spreading symbol sequence generator $$S = \begin{bmatrix} -\frac{1}{\sqrt{2}} & \frac{1}{\sqrt{2}} & 0 \\ -\frac{1}{\sqrt{2}} & -\frac{1}{\sqrt{2}} & j \end{bmatrix}$$

identified above, the matrix $$S_r = \begin{bmatrix} -\frac{1}{\sqrt{2}} & \frac{1}{\sqrt{2}} & 0 \\ -\frac{1}{\sqrt{2}} & -\frac{1}{\sqrt{2}} & 0 \end{bmatrix}$$

and the matrix $$S_i = \begin{bmatrix} 0 & 0 & 0 \\ 0 & 0 & 1 \end{bmatrix}.$$

There are two real component signatures that are not equal to zero in $S_r$, namely $$\begin{bmatrix} -\frac{1}{\sqrt{2}} & \frac{1}{\sqrt{2}} \\ -\frac{1}{\sqrt{2}} & -\frac{1}{\sqrt{2}} \end{bmatrix}.$$

The real component signatures are orthogonal to each other. There is only one imaginary component signature for $S_i$. Therefore, based on the compatibility rules being met, S is valid.

The following are two examples of modulation and spreading symbol sequence generator matrices that would not be valid based on the proposed rules. A first modulation and spreading symbol sequence generator $$S = \begin{bmatrix} 1 & j & 0 \\ 1 & 0 & j \end{bmatrix}$$

is not a valid modulation and spreading symbol sequence generator as the power of columns are not equal. A second modulation and spreading symbol sequence generator matrix $$S = \begin{bmatrix} -\frac{1}{\sqrt{2}} & \frac{j}{\sqrt{2}} & 0 \\ -\frac{1}{\sqrt{2}} & -\frac{j}{\sqrt{2}} & j \end{bmatrix}$$

is not valid as it violates the orthogonality rule. For matrix $$S = \begin{bmatrix} -\frac{1}{\sqrt{2}} & \frac{j}{\sqrt{2}} & 0 \\ -\frac{1}{\sqrt{2}} & -\frac{j}{\sqrt{2}} & j \end{bmatrix},$$

a real component signature matrix $$S_r = \begin{bmatrix} -\frac{1}{\sqrt{2}} & 0 & 0 \\ -\frac{1}{\sqrt{2}} & 0 & 0 \end{bmatrix}$$

and an imaginary component signature matrix $$S_i = \begin{bmatrix} 0 & \frac{1}{\sqrt{2}} & 0 \\ 0 & -\frac{1}{\sqrt{2}} & 1 \end{bmatrix}.$$

There are two imaginary component signatures that are not equal to zero in $S_i$, namely $$\begin{bmatrix} \frac{1}{\sqrt{2}} & 0 \\ -\frac{1}{\sqrt{2}} & 1 \end{bmatrix}.$$

As these two imaginary component signatures are not orthogonal to one another S is not valid.

To generate a (non-sparse) symbol sequence, the spreading symbol sequence generator that is either generated from a selection of spreading signatures or selected from a pool of spreading matrices can be considered to have the following appearance:

$$S=[S_1^{(i1)}|S_2^{(i2)}|S_3^{(i3)}|\ldots S_M^{(iM)}]$$

where $S_m^{(i_m)}$ may denote a signature corresponding to an index $i_m$ in a pool of signatures defined for group m.

In the case that spreading symbol sequence generator is constructed from a selection of spreading signatures, the indices $i_m$, m=1, ..., M correspond to a signature index i by the predefined functions $f_m$, m=1, ..., M such that $i_m = f_m(i)$. In some embodiments, i can be the UE ID, group UE ID and the like.

In some embodiments, the columns of the spreading symbol sequence generator matrix which can also be regarded as spreading signatures can be modified by phase rotation or power adjustment, or both, to one or more of the elements in a respective spreading signature resulting in $$S = [\alpha_1 S_1^{(i_1)} | \alpha_2 S_2^{(i_2)} | \alpha_3 S_3^{(i_3)} | \ldots \alpha_M S_M^{(i_M)}]$$

where $\alpha_m$, m=1, ..., M are either real or imaginary values.

In some other embodiments, the modulation and spreading symbol sequence generator also incorporates a scrambling component:

$$S = S_{base} \bullet * C$$

where $S_{base} = [S_1^{(i_1)} | S_2^{(i_2)} \uparrow S_3^{(i_3)} | \ldots S_M^{(i_M)}]$, C is the scrambling component with either real or imaginary elements and •* denotes an element-wise product.

In the case that spreading symbol sequence generator is constructed from a selection of spreading signatures, the overall signature index can be defined as a vector of indices corresponding to a signature group. In such a case, an overall signature pool is defined as a subset of a Cartesian product of multiple individual signature pools, i.e. $P = P_1 \times P_2 \times \ldots \times P_M$. For example, the overall signature pool can be defined as a collection of index pairs, for example {(1,1) (1,2) (2,1), (3,2), (4,1), ...}, where a first element of each index pair denotes an index of a group of signatures and the second element of the index pair denotes a signature index within the group.

The following example illustrates a selection of signatures for a modulation and spreading symbol sequence generator having N=2 and M=3 from the following signature groups, each group having respective signature pool. Signature group 1 ($S_1$) includes a pool comprised of the following signatures $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

and Signature group 2 ($S_2$) includes a pool comprised of the following signatures $$\left\{ \begin{bmatrix} 1 \\ 0 \end{bmatrix}, \begin{bmatrix} 0 \\ 1 \end{bmatrix} \right\}.$$

Further examples provided below are for the sake of evaluating modulation and spreading matrices that have been selected based on the methods described herein and for which more detailed description of how the selection process can be implemented will be provided below.

For a modulation and spreading symbol sequence generator having selected signatures defined as $$\left[ -\frac{1}{\sqrt{2}} S_{11} | j S_{21} | j S_{22} \right]$$

where signature index $S_{ij}$ denotes the jth signature from the ith signature group of the two signature groups described above, the modulation and spreading symbol sequence generator is represented as $$\begin{bmatrix} -\frac{1}{\sqrt{2}} & j & 0 \\ -\frac{1}{\sqrt{2}} & 0 & j \end{bmatrix}.$$

In this example, the signature index can be described as: [(1,1) (2,1) (2,2)].

As another descriptive example, a modulation and spreading symbol sequence generator having signatures selected based on the signature index [(1,1) (1,1)] based on use of just signature group 1 above is represented as:

$$S = [S_{11} \quad jS_{11}] = \begin{bmatrix} 1 & j \\ 1 & j \end{bmatrix}$$

which corresponds to the linear spreading with spreading signature of [1 1] and QPSK modulation.

As another descriptive example, a modulation and spreading symbol sequence generator having signatures selected based on the signature index [(1,2) (2,1) (2,2)] based on use of Signature groups 1 and 2 above is represented as:

$$\begin{bmatrix} -\frac{1}{\sqrt{2}} & j & 0 \\ +\frac{1}{\sqrt{2}} & 0 & j \end{bmatrix}$$

In another example, a single signature group may have the following signature pool:

$$P = \left\{ \begin{bmatrix} 1 \\ 1 \end{bmatrix}, \begin{bmatrix} 1 \\ -1 \end{bmatrix}, \begin{bmatrix} j \\ j \end{bmatrix}, \begin{bmatrix} j \\ -j \end{bmatrix}, \begin{bmatrix} 1 \\ j \end{bmatrix}, \begin{bmatrix} 1 \\ -j \end{bmatrix} \right\}.$$

A modulation and spreading symbol sequence generator S with N=2 and M=4 having signatures selected based on the following signature indices $[P_1|P_2|P_3|P_4]$ corresponds to $$S = \begin{bmatrix} 1 & 1 & j & j \\ 1 & -1 & j & -j \end{bmatrix}.$$

In this example, the signature index can be written as [1 2 3 4] as it is the first four signatures of the signature pool that are selected in the modulation and spreading symbol sequence generator. In the example modulation and spreading symbol sequence generator S, each row of common elements in different signatures has two real elements and two imaginary elements. Furthermore, the signatures corresponding to pure real elements (the first signature) and pure imaginary elements (the third signature) are orthogonal to each other resulting in a valid spreading matrix according to the compatibility rules described above.

In a further example, for a modulation and spreading symbol sequence generator with N=2 and M=4 and a single signature pool:

$$P = \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\},$$

the modulation and spreading symbol sequence generator S of selected signatures with the following signature indices [$P_2|P_1|P_2|P_1$] and the scrambling component of $$\begin{bmatrix} 2 & 1 & 2j & j \\ 1 & 2 & j & 2j \end{bmatrix}$$

corresponds to $$S = \begin{bmatrix} 2 & 1 & 2j & j \\ -1 & 2 & -j & 2j \end{bmatrix}.$$

In this example, the signature index can be written as [2 1 2 1]. In the example modulation and spreading symbol sequence generator, each row of common elements in different signatures has two real elements and two imaginary elements. Furthermore, the signatures corresponding to pure real elements (the first signature) and pure imaginary elements (the second signature) are orthogonal to each other resulting in a valid modulation and spreading symbol sequence generator according to the compatibility rules described above. Note that the same spreading symbol sequence generator S can also be generated selecting signatures from the signature pool $$P = \left\{ \begin{bmatrix} 2 \\ -1 \end{bmatrix}, \begin{bmatrix} 1 \\ 2 \end{bmatrix}, \begin{bmatrix} 2j \\ -j \end{bmatrix}, \begin{bmatrix} j \\ 2j \end{bmatrix} \right\}$$

and the signature index [1 2 3 4] without using the scrambling component.

In some embodiments, the signature pools of different groups that may each be attributed to a different property are unified into a single pool of signatures and the modulation and spreading symbol sequence generator is generated by selecting the appropriate signature indices from the signature pool based on the capability rules.

In a particular example, a unified pool of signatures can be defined as $$P = \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 \\ 0 \end{bmatrix}, \begin{bmatrix} 0 \\ 1 \end{bmatrix} \right\}.$$

A modulation and spreading symbol sequence generator S generated with selection of the following signature indices $$\left[ -\frac{1}{\sqrt{2}} P_1 | j P_5 | j P_6 \right]$$

is represented as $$S = \begin{bmatrix} -\frac{1}{\sqrt{2}} & j & 0 \\ -\frac{1}{\sqrt{2}} & 0 & j \end{bmatrix}.$$

In such a case, the signature index for the modulation and spreading symbol sequence generator can be written as [1 5 6], as it is the first, fifth and sixth signatures of the pool that are selected. A modulation and spreading symbol sequence generator of this form is equivalent to an SCMA 8-point codebook.

In the case that one or more pools of spreading symbol sequence generator matrices are constructed in advance, the generation of such matrices are based on the pre-defined compatibility rules. A spreading matrix can also be referred to as a set of spreading signatures. The matrices in each group/pool can have some common features such as, but not limited to, the same number of columns or the same sparsity factor, or both. The spreading symbol sequence generator matrices can correspond to the non-sparse symbol sequence generation and hence they may not incorporate the sparsity patterns. The spreading symbol sequence generator matrices can also be referred to as NoMA codebooks as they are used to generate the symbol sequence for NoMA transmission. Each UE is provided or selects a NoMA codebook once it is connected to the network. The NoMA codebooks utilized by different UEs may be different to facilitate the decoding of UEs' data at the receiver side. Having defined a pool of spreading symbol sequence generator matrices (or NoMA codebooks), provides flexibility of selecting/assigning different codebooks to the UEs and as a result may facilitate the detection of NoMA transmissions from multiple UEs. One example of a pool of spreading symbol sequence generator matrices is provided below which consists of three groups of matrices:

TABLE 1

Example of a pool of three groups of spreading symbol sequence generator matrices to generate non-sparse symbol sequence

| Group index | Set of spreading symbol sequence generator matrices |
|---|---|
| 1 | $\begin{bmatrix} 1 & j \\ 1 & j \end{bmatrix}, \begin{bmatrix} 1 & j \\ -1 & -j \end{bmatrix}, \begin{bmatrix} 1 & j \\ j & -1 \end{bmatrix}, \begin{bmatrix} 1 & j \\ -j & 1 \end{bmatrix}$ |
| 2 | $\begin{bmatrix} -\frac{1}{\sqrt{2}} & j & 0 \\ -\frac{1}{\sqrt{2}} & 0 & j \end{bmatrix}, \begin{bmatrix} -\frac{1}{\sqrt{2}} & j & 0 \\ \frac{1}{\sqrt{2}} & 0 & -j \end{bmatrix},$ $\begin{bmatrix} -\frac{1}{\sqrt{2}} & j & 0 \\ -\frac{j}{\sqrt{2}} & 0 & -1 \end{bmatrix}, \begin{bmatrix} -\frac{1}{\sqrt{2}} & j & 0 \\ \frac{j}{\sqrt{2}} & 0 & 1 \end{bmatrix}$ |
| 3 | $\begin{bmatrix} 1 & j & 0 & 0 \\ 0 & 0 & 1 & j \end{bmatrix}, \begin{bmatrix} 1 & 1 & j & j \\ 1 & -1 & j & -j \end{bmatrix}$ |

In this case, the NoMA codebook index, which can also be considered as a multiple access signature index, can be defined as the pair (group_index, cb_index), where the group_index corresponds to the Group Index in the first column of Table 1 and the cb_index is a number corresponding to the selected spreading matrix in each group of spreading matrices. Alternatively, the NoMA codebook can be indicated by one index or more than two indices. In the given example above, all matrices given in the same group have the same number of columns which can be regarded as modulation index. Therefore, the group index may also specify the modulation order (or vice-versa). The number of rows in the matrices can represent the number of non-zero elements in the spreading block. In some embodiments, the grouping of the matrices can also be based on the number of rows. In this case, all matrices in the same group contain the same number of rows which means they are used to generate non-sparse symbol sequence with the same number of non-zero elements. In another embodiment, the spreading matrices can be grouped based on one or more parameters such as transport block size (TBS), modulation and coding scheme (MCS), receiver capability, required KPI, traffic load (e.g. the average number of users connecting the network simultaneously or overloading factor), PAPR requirement, an application scenario and/or transmission type, so that all matrices within the same group can satisfy the same requirement. For example, it is possible that the matrices within the same group are all suitable for a high overloading scenario and all matrices within another group are all suitable to achieve low-PAPR transmission. Other possibilities and/or parameters for grouping the matrices exist.

Figure 4B:
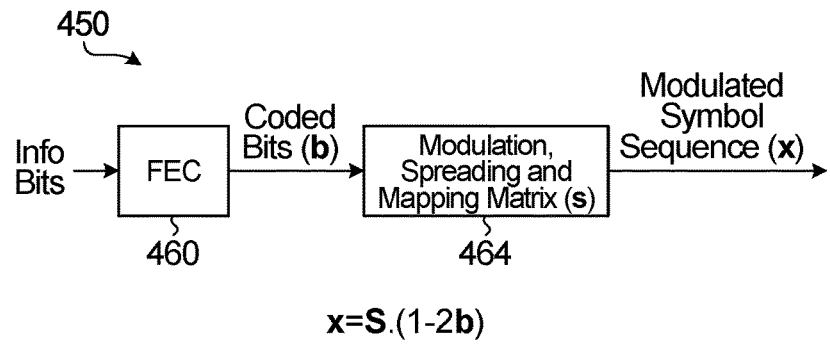
FIG. 4B is a block diagram illustrating an example of an apparatus that could be used in implementing a non-orthogonal multiple access (NoMA) scheme according to another aspect of the disclosure.

In some embodiments, the symbol to RE mapping functionality shown in block 426 of FIG. 4A is incorporated into the modulation and spreading symbol generator 424. FIG. 4B illustrates such an example of an apparatus 450 implementing a collection of signal processing operations that may be part of a framework for generating a NoMA signal, which includes units to function as a FEC encoder 460 and a modulation, spreading and mapping block 464. The output of the FEC encoder 460 is coded bits b. The output of the modulation, spreading and mapping block 464 is a modulated symbol sequence x. Modulation performed by the modulation, spreading and mapping block 464 can be Quadrature Amplitude Modulation (QAM) such as Binary Phase Shift Keying (BPSK) or Quadrature Phase Shift Keying (QPSK). When the QAM is BPSK, the modulated symbol sequence x can be expresses as x=S*(1-2b), where S is the modulation and spreading symbol sequence generator. The modulation and spreading symbol sequence generator can be defined by having M signatures and each signature having N elements that denotes the spreading factor over a symbol block. Such an apparatus may be used for sparse symbol sequence generation.

As in the non-sparse symbol sequence generation described above, the sparse symbol sequence generation may incorporate any one or more of phase rotation or power adjustment of the signatures and a scrambling component to scramble signatures. In some embodiments, the modulation and spreading symbol sequence generator also incorporates a rotation component. This can be expressed in the form $S = \Phi S_{base}$ where $S_{base} = [S_1^{(i1)} | S_2^{(i2)} | S_3^{(i3)} | \ldots S_M^{(iM)}]$ and $\Phi$ is the rotation component. The rotation component can be useful in low peak to average power ratio (PAPR) transmission applications The following example illustrates selection of signatures for a modulation and spreading symbol sequence generator having N=4 and M=3 from the following signature groups having respective signature pools. Signature group 1 ($S_1$) includes of pool of the following signatures $$\left\{ \begin{bmatrix} 1 \\ 1 \\ 0 \\ 0 \end{bmatrix}, \begin{bmatrix} 0 \\ 0 \\ 1 \\ 1 \end{bmatrix}, \begin{bmatrix} 1 \\ 0 \\ 1 \\ 0 \end{bmatrix}, \begin{bmatrix} 0 \\ 1 \\ 0 \\ 1 \end{bmatrix}, \begin{bmatrix} 1 \\ 0 \\ 0 \\ 1 \end{bmatrix}, \begin{bmatrix} 0 \\ 1 \\ 1 \\ 0 \end{bmatrix}, \begin{bmatrix} 1 \\ -1 \\ 0 \\ 0 \end{bmatrix}, \right.$$

$$\left. \begin{bmatrix} 0 \\ 0 \\ 1 \\ -1 \end{bmatrix}, \begin{bmatrix} 1 \\ 0 \\ -1 \\ 0 \end{bmatrix}, \begin{bmatrix} 0 \\ 1 \\ 0 \\ -1 \end{bmatrix}, \begin{bmatrix} 0 \\ 1 \\ 0 \\ -1 \end{bmatrix} \right\}$$

and Signature group 2 ($S_2$) includes a pool of the following signatures $$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}.$$

The modulation and spreading symbol sequence generator including selected signatures that meet compatibility rules can be defined as $$\left[ -\frac{1}{\sqrt{2}} S_{12} | j S_{23} | j S_{24} \right]$$

where $S_{ij}$ denotes the jth signature from the ith signature groups described above. As a result, the modulation and spreading symbol sequence generator is represented as $$S = \begin{bmatrix} 0 & 0 & 0 \\ 0 & 0 & 0 \\ -\frac{1}{\sqrt{2}} & j & 0 \\ -\frac{1}{\sqrt{2}} & 0 & j \end{bmatrix}.$$

In this example, a signature index of the modulation and spreading symbol sequence generator matrix can be defined as: [(1,2) (2,3) (2,4)]. A modulation and spreading symbol sequence generator of this form is equivalent to an SCMA 8-point codebook having a sparsity pattern [0 0 1 1].

In a further example, a modulation and spreading symbol sequence generator matrix corresponding to a signature index [(1,7) (2,3) (2,4)] of selected signatures that meet the compatibility rules based on the signature groups above is represented as $$S = \begin{bmatrix} 0 & 0 & 0 \\ 0 & 0 & 0 \\ -\frac{1}{\sqrt{2}} & j & 0 \\ +\frac{1}{\sqrt{2}} & 0 & j \end{bmatrix}.$$

In another example, a modulation and spreading symbol sequence generator having N=4 and M=3, is generated from selection of signatures of the following signature groups that have the identified corresponding signature pools. Signature group 1 ($S_1$) includes a pool having the following signatures $$\left\{ \begin{bmatrix} 1 \\ 1 \\ 1 \\ 1 \end{bmatrix}, \begin{bmatrix} 1 \\ -1 \\ 1 \\ 1 \end{bmatrix}, \begin{bmatrix} 1 \\ 1 \\ -1 \\ 1 \end{bmatrix}, \begin{bmatrix} 1 \\ 1 \\ 1 \\ -1 \end{bmatrix}, \begin{bmatrix} 1 \\ j \\ 1 \\ j \end{bmatrix}, \begin{bmatrix} 1 \\ j \\ -1 \\ j \end{bmatrix} \right\}$$

and Signature group 2 ($S_2$) includes a pool having the following signatures $$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}.$$

A modulation and spreading symbol sequence generator matrix S of selected signatures defined as $$\left[ -\frac{1}{\sqrt{2}} S_{15} | S_{22} | S_{24} \right],$$

wherein $S_{ij}$ denotes the jth signature from the ith signature groups identified above, corresponds to $$S = \begin{bmatrix} 1/2 & 0 & 0 \\ 1/2j & 1 & 0 \\ 1/2 & 0 & 0 \\ 1/2j & 0 & 1 \end{bmatrix}.$$

In this case, the signature index can be written as [(1,5) (2,2) (2,4)].

In another example, a modulation and spreading symbol sequence generator having N=4 and M=2 is selected from the same Signature group 1 identified in the previous example. A modulation and spreading symbol sequence generator S with the signature indices $[S_{11}|jS_{11}]$ is represented as $$S = \begin{bmatrix} 1 & j \\ 1 & j \\ 1 & j \\ 1 & j \end{bmatrix}.$$

In this case, the signature index can be written as: [(1,1) (1,1)]. This corresponds to the linear spreading with spreading signature of [1 1 1 1] and QPSK modulation.

In another example, a modulation and spreading symbol sequence generator having N=4 and M=3 is selected from the same Signature group 1 identified in the previous example and a Signature group 2 ($S_2$) including a pool having the following signatures $$\left\{ \begin{bmatrix} 1 \\ 1 \\ 0 \\ 0 \end{bmatrix}, \begin{bmatrix} 0 \\ 0 \\ 1 \\ 1 \end{bmatrix}, \begin{bmatrix} 1 \\ 0 \\ 1 \\ 0 \end{bmatrix}, \begin{bmatrix} 0 \\ 1 \\ 0 \\ 1 \end{bmatrix}, \begin{bmatrix} 1 \\ 0 \\ 0 \\ 1 \end{bmatrix}, \begin{bmatrix} 0 \\ 1 \\ 1 \\ 0 \end{bmatrix} \right\}.$$

A modulation and spreading symbol sequence generator S with the signature indices $$\left[ -\frac{1}{\sqrt{2}} S_{11} | j S_{23} | j S_{24} \right]$$

is represented as $$S = \begin{bmatrix} 1/2 & j & 0 \\ 1/2 & 0 & j \\ 1/2 & j & 0 \\ 1/2 & 0 & j \end{bmatrix}.$$

In this case, the signature index can be written as: [(1,1) (2,3) (2,4)].

In yet another example with the same Signature groups 1 and 2 as in the previous example, and a third signature group, Signature group 3 $S_3$ including a pool having the following signatures $$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

a modulation and spreading symbol sequence generator matrix S with selected signature indices $$\left[ -\frac{1}{\sqrt{2}} S_{11} | j S_{23} | j S_{34} \right]$$

is represented as $$S = \begin{bmatrix} 1/2 & j & 0 \\ 1/2 & 0 & 0 \\ 1/2 & j & 0 \\ 1/2 & 0 & j \end{bmatrix}.$$

In this case, the signature index can be written as: [(1,1) (2,3) (3,4)].

For a sparse symbol sequence generation scheme, in some embodiments, the signature pools of different groups can be unified into a single pool and the modulation and spreading symbol sequence generator is configured by selecting the appropriate signature indices from the pool based on a given rule.

For example, for a unified pool P of signatures $$P = \left\{ \begin{bmatrix} 1 \\ 1 \\ 1 \\ 1 \end{bmatrix}, \begin{bmatrix} 1 \\ -1 \\ 1 \\ 1 \end{bmatrix}, \begin{bmatrix} 1 \\ 1 \\ -1 \\ 1 \end{bmatrix}, \begin{bmatrix} 1 \\ 1 \\ 1 \\ -1 \end{bmatrix}, \right.$$

$$\left. \begin{bmatrix} 1 \\ j \\ 1 \\ j \end{bmatrix}, \begin{bmatrix} 1 \\ j \\ -1 \\ j \end{bmatrix}, \begin{bmatrix} 1 \\ 1 \\ 0 \\ 0 \end{bmatrix}, \begin{bmatrix} 0 \\ 0 \\ 1 \\ 1 \end{bmatrix}, \begin{bmatrix} 1 \\ 0 \\ 1 \\ 0 \end{bmatrix}, \begin{bmatrix} 0 \\ 1 \\ 0 \\ 1 \end{bmatrix}, \begin{bmatrix} 1 \\ 0 \\ 0 \\ 1 \end{bmatrix}, \begin{bmatrix} 0 \\ 1 \\ 1 \\ 0 \end{bmatrix}, \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

a modulation and spreading symbol sequence generator S is generated based on signatures with the following signature indices $$\left[ -\frac{1}{\sqrt{2}} P_1 | j P_9 | j P_{16} \right],$$

which is represented as $$S = \begin{bmatrix} 1/2 & j & 0 \\ 1/2 & 0 & 0 \\ 1/2 & j & 0 \\ 1/2 & 0 & j \end{bmatrix}.$$

In such a case, the signature index can be written as: [1 9 16].

In the case that one or more pools of spreading symbol sequence generator matrices are constructed in advance, the generation of such matrices are based on the pre-defined compatibility rules. The matrices in each group/pool can have some common features such as, but not limited to, the same number of columns, the same number of rows, the same sparsity factor and the same sparsity pattern. The number of rows in the matrices may correspond to the spreading factor. The spreading symbol sequence generator matrices can correspond to the sparse symbol sequence generation and hence they may incorporate the sparsity patterns in them to generate the sparse symbol sequence if desired. The spreading symbol sequence generator matrices can also be referred to as NoMA codebooks as they are used to generate the symbol sequence for NoMA transmission. Each UE is provided or selects a NoMA codebook once it is connected to the network. The NoMA codebooks utilized by different UEs may be different facilitating the decoding of UEs' data at the receiver side. Having defined a pool of spreading symbol sequence generator matrices or NoMA codebooks provides flexibility of selecting/assigning different codebooks to the UEs facilitating further the multi-UE decoding process. One example of a pool of spreading symbol sequence generator matrices is provided below which consists of three groups of matrices:

TABLE 1

Example of pool of three groups of spreading symbol sequence generator matrices to generate sparse symbol sequence

| Group index | Set of spreading symbol sequence generator matrices |
|---|---|
| 1 | $\begin{bmatrix} 1 & j \\ 1 & j \\ 1 & j \\ 1 & j \end{bmatrix}, \begin{bmatrix} 1 & j \\ -1 & -j \\ 1 & j \\ 1 & j \end{bmatrix}, \begin{bmatrix} 1 & j \\ 1 & j \\ -1 & -j \\ 1 & j \end{bmatrix}, \begin{bmatrix} 1 & j \\ 1 & j \\ 1 & j \\ -1 & -j \end{bmatrix}, \begin{bmatrix} 1 & j \\ j & -1 \\ -1 & -j \\ j & -1 \end{bmatrix},$ $\begin{bmatrix} 1 & j \\ j & -1 \\ 1 & j \\ j & -1 \end{bmatrix}, \begin{bmatrix} 1 & j \\ -j & 1 \\ 1 & j \\ j & -1 \end{bmatrix}, \begin{bmatrix} 1 & j \\ j & -1 \\ 1 & j \\ -j & 1 \end{bmatrix}, \begin{bmatrix} 1 & j \\ 1 & j \\ j & -1 \\ j & -1 \end{bmatrix}, \begin{bmatrix} 1 & j \\ -1 & -j \\ j & -1 \\ j & -1 \end{bmatrix},$ $\begin{bmatrix} 1 & j \\ 1 & j \\ j & -1 \\ -j & 1 \end{bmatrix}, \begin{bmatrix} 1 & j \\ 1 & j \\ j & -1 \\ j & -1 \end{bmatrix}, \begin{bmatrix} 1 & j \\ j & -1 \\ j & -1 \\ 1 & j \end{bmatrix}, \begin{bmatrix} 1 & j \\ j & -1 \\ j & -1 \\ -1 & -j \end{bmatrix}, \begin{bmatrix} 1 & j \\ j & -1 \\ -j & 1 \\ 1 & j \end{bmatrix},$ $\begin{bmatrix} 1 & j \\ -j & 1 \\ j & -1 \\ 1 & j \end{bmatrix}$ |
| 2 | $\begin{bmatrix} -\frac{1}{\sqrt{2}} & j & 0 \\ -\frac{1}{\sqrt{2}} & 0 & j \\ 0 & 0 & 0 \\ 0 & 0 & 0 \end{bmatrix}, \begin{bmatrix} -\frac{1}{\sqrt{2}} & j & 0 \\ \frac{1}{\sqrt{2}} & 0 & -j \\ 0 & 0 & 0 \\ 0 & 0 & 0 \end{bmatrix}, \begin{bmatrix} -\frac{1}{\sqrt{2}} & j & 0 \\ 0 & 0 & 0 \\ -\frac{1}{\sqrt{2}} & 0 & j \\ 0 & 0 & 0 \end{bmatrix},$ $\begin{bmatrix} -\frac{1}{\sqrt{2}} & j & 0 \\ 0 & 0 & 0 \\ \frac{1}{\sqrt{2}} & 0 & -j \\ 0 & 0 & 0 \end{bmatrix}, \begin{bmatrix} -\frac{1}{\sqrt{2}} & j & 0 \\ 0 & 0 & 0 \\ 0 & 0 & 0 \\ -\frac{1}{\sqrt{2}} & 0 & j \end{bmatrix}, \begin{bmatrix} -\frac{1}{\sqrt{2}} & j & 0 \\ 0 & 0 & 0 \\ 0 & 0 & 0 \\ \frac{1}{\sqrt{2}} & 0 & -j \end{bmatrix},$ $\begin{bmatrix} 0 & 0 & 0 \\ -\frac{1}{\sqrt{2}} & j & 0 \\ -\frac{1}{\sqrt{2}} & 0 & j \\ 0 & 0 & 0 \end{bmatrix}, \begin{bmatrix} 0 & 0 & 0 \\ -\frac{1}{\sqrt{2}} & j & 0 \\ \frac{1}{\sqrt{2}} & 0 & -j \\ 0 & 0 & 0 \end{bmatrix}, \begin{bmatrix} 0 & 0 & 0 \\ -\frac{1}{\sqrt{2}} & j & 0 \\ 0 & 0 & 0 \\ -\frac{1}{\sqrt{2}} & 0 & j \end{bmatrix},$ $\begin{bmatrix} 0 & 0 & 0 \\ -\frac{1}{\sqrt{2}} & j & 0 \\ 0 & 0 & 0 \\ \frac{1}{\sqrt{2}} & 0 & -j \end{bmatrix}, \begin{bmatrix} 0 & 0 & 0 \\ 0 & 0 & 0 \\ -\frac{1}{\sqrt{2}} & j & 0 \\ -\frac{1}{\sqrt{2}} & 0 & j \end{bmatrix}, \begin{bmatrix} 0 & 0 & 0 \\ 0 & 0 & 0 \\ -\frac{1}{\sqrt{2}} & j & 0 \\ \frac{1}{\sqrt{2}} & 0 & -j \end{bmatrix}$ |
| 3 | $\begin{bmatrix} 1 & j & 0 & 0 \\ 0 & 0 & 1 & j \\ 0 & 0 & 0 & 0 \\ 0 & 0 & 0 & 0 \end{bmatrix}, \begin{bmatrix} 1 & j & 0 & 0 \\ 0 & 0 & 0 & 0 \\ 0 & 0 & 1 & j \\ 0 & 0 & 0 & 0 \end{bmatrix}, \begin{bmatrix} 1 & j & 0 & 0 \\ 0 & 0 & 0 & 0 \\ 0 & 0 & 0 & 0 \\ 0 & 0 & 1 & j \end{bmatrix}, \begin{bmatrix} 0 & 0 & 0 & 0 \\ 1 & j & 0 & 0 \\ 0 & 0 & 1 & j \\ 0 & 0 & 0 & 0 \end{bmatrix}$ |

TABLE 1-continued

Example of pool of three groups of spreading symbol sequence generator matrices to generate sparse symbol sequence

| Group index | Set of spreading symbol sequence generator matrices |
|---|---|

$$\begin{bmatrix} 0 & 0 & 0 & 0 \\ 1 & j & 0 & 0 \\ 0 & 0 & 0 & 0 \\ 0 & 0 & 1 & j \end{bmatrix}, \begin{bmatrix} 0 & 0 & 0 & 0 \\ 0 & 0 & 0 & 0 \\ 1 & j & 0 & 0 \\ 0 & 0 & 1 & j \end{bmatrix}, \begin{bmatrix} 1 & 1 & j & j \\ 1 & -1 & j & -j \\ 0 & 0 & 0 & 0 \\ 0 & 0 & 0 & 0 \end{bmatrix},$$

$$\begin{bmatrix} 1 & 1 & j & j \\ 0 & 0 & 0 & 0 \\ 1 & -1 & j & -j \\ 0 & 0 & 0 & 0 \end{bmatrix}, \begin{bmatrix} 1 & 1 & j & j \\ 0 & 0 & 0 & 0 \\ 0 & 0 & 0 & 0 \\ 1 & -1 & j & -j \end{bmatrix}, \begin{bmatrix} 0 & 0 & 0 & 0 \\ 1 & 1 & j & j \\ 1 & -1 & j & -j \\ 0 & 0 & 0 & 0 \end{bmatrix},$$

$$\begin{bmatrix} 0 & 0 & 0 & 0 \\ 1 & 1 & j & j \\ 0 & 0 & 0 & 0 \\ 1 & -1 & j & -j \end{bmatrix}, \begin{bmatrix} 0 & 0 & 0 & 0 \\ 0 & 0 & 0 & 0 \\ 1 & 1 & j & j \\ 1 & -1 & j & -j \end{bmatrix}$$

In the provided example above, all matrices have 4 rows which indicates that the spreading factor is equal to 4. Other values of spreading factors are not precluded. In the given example above, all matrices given in the same group have the same number of columns which can be regarded as the modulation order. The groups are defined in the way that the matrices in the first group each contain 2 columns which indicate the modulation order of 4, the matrices in the second group each contain 3 columns which indicate the modulation order of 8 and the matrices in the third group each contain 4 columns which indicate the modulation order of 16. Furthermore, the matrices in the first group contain no zero elements, which implies non-sparse spreading while the matrices in the second and third groups contain all-zero rows, which implies sparse spreading. The sparsity patterns are also incorporated in the spreading matrices in the second and third groups. In this case, the NoMA codebook index, which can also be considered as multiple access signature index, can be defined as the pair (group_index, cb_index). Therefore, the group index also specifies the modulation order as all matrices given in the same group have the same modulation order as mentioned above. Alternatively, NoMA codebook can be indicated using one index or more than two indices. In some embodiments, the grouping of the matrices can also be based on the number of rows. In this case, all matrices in the same group contain the same number of rows which means they are used to generate symbol sequence with the same number of elements which can be referred to as the spreading factor. In another embodiment, the spreading matrices can be grouped based on transport block size (TBS), modulation and coding scheme (MCS), receiver capability, required KPI, traffic load (which reflects the average number of users connecting the network simultaneously or overloading factor), required KPI, PAPR requirement, an application scenario and transmission type, so that all matrices within the same group can satisfy the same requirement. For example, it is possible that the matrices within the same group are all suitable for high overloading scenario and all matrices within another group are all suitable to achieve low-PAPR transmission.

A further aspect of the present disclosure provides a method for transmitting a non-orthogonal multiple access transmission which includes using a collection of spreading signatures from one or more pools of signatures as described above. The method includes selection of a set of spreading signatures, from one or more pools of signatures, applying a signal to the selected signatures to generate spread sequences and multiplexing the spread sequences based on a multiplexing rule. In some embodiments, an overall signature pool can be defined as a collection of the individual pools.

The UE is either provided with a selection of the signatures to use in the modulation and spreading sequence generator or the UE can select the signatures to use. The spreading signatures can be selected based on compatibility rules. Examples of the compatibility rules may include the elements of the sequences should be either pure real or pure imaginary, over each element of the spreading sequences, if there are more than one sequence having real or imaginary elements, those sequences should be orthogonal to each other in both real/imaginary domain.

As part of selecting signatures from a pool of signatures, the pool being comprised of one or more groups of signatures, some implementations of the present disclosure involve determining a number of signatures to be selected for generation of the modulation and spreading symbol matrix. This number corresponds to an order, or rank, of the modulation and spreading symbol matrix r. For example, the number r can be based on one or more parameters such as spectral efficiency (SE), transport block size (TBS), modulation and coding scheme (MCS), traffic load (which reflects the average number of users connecting the network simultaneously or overloading factor), transmission type, an application scenario or required key performance indicators (KPI), and/or receiver capability that will be receiving the modulated and spread symbols. In some implementations, the network may determine the rank and provide that value to the UE to be used in the UE's selection of spreading signatures. In some implementations, the UE may determine the rank to be used in the UE's selection of spreading signatures. Once the rank is determined, selection of the spreading signatures can be based on methods described below.

In an implementation in which the signature pool is a single pool consisting of N spreading signatures, wherein N is an integer 1, the UE selects a given number of signatures from the pool. In some embodiments, the number of signatures is determined as described above. One way this selection can be done is a sequential selection of spreading signatures, i.e. a first signature is selected, then a second, then a third, and so on until the desired number of signature are selected. For example, the UE selects a first signature as a function of the UE ID $f_1(UE_{ID})$ and other possible factors. Once the first signature is selected this will reduce the number of signatures in the signature pool that can be selected as a second signature that is compatible based on the compatibility rules discussed above. The UE may be capable of determining which remaining signatures are compatible with current selected signatures. The selection continues based on the compatibility rules until a sufficient number of signatures are selected.

The mapping rule between the UE ID (and other possible parameters) and the signature index in each stage of the selection may be known at both the UE and network. In such a case there may be no explicit signalling to inform the network about the selection. However, explicit signalling is not precluded from use.

In implementations where the signature pool consists of multiple groups $P_k$ that have been grouped according to some criteria, a similar procedure can be applied for signature selection based on the compatibility rules and possibly based on additional factors identified above, except that the mapping is done between the UE ID and an index pair, such as the group index and signature index within the group as described above. After each selection of a signature based on the compatibility rules, the signatures within each group that are compatible with the already selected signatures is reduced. In some embodiments, to simplify the selection procedure, the UE ID determines the group index and all signatures will be selected within the given group. In some other embodiments, a maximum of one signature is selected from each group and the index of the signature is determined by the UE ID.

Once the signatures are selected, the method includes the following steps. The input bit sequence b is divided into multiple sub-sequences $\{b_1, b_2, \ldots, b_K\}$ where the size of each sub-sequence is determined based on the spreading factor of the individual signatures. In some embodiments, the sub-sequences $\{b_1, b_2, \ldots, b_K\}$ are of the same size.

In a further step, for a particular signature index associated with a signature, a stream-specific symbol sequence $x_k$, k=1, . . . , K is generated by mapping the input bit sequence to the output symbol sequence where the mapping is determined by the spreading sequence k.

The generated NoMA signals are then multiplexed to construct the final NoMA signal based on a multiplexing rule. The multiplexing rule may include phase rotation to make sure each symbol in the plurality of symbol sequences are either pure real or pure imaginary, power adjustment to make the sum powers of the symbol sequences to be equal, scrambling or interleaving, or both, of each symbol sequence and the addition of the symbol sequences in the complex domain.

Figure 5:
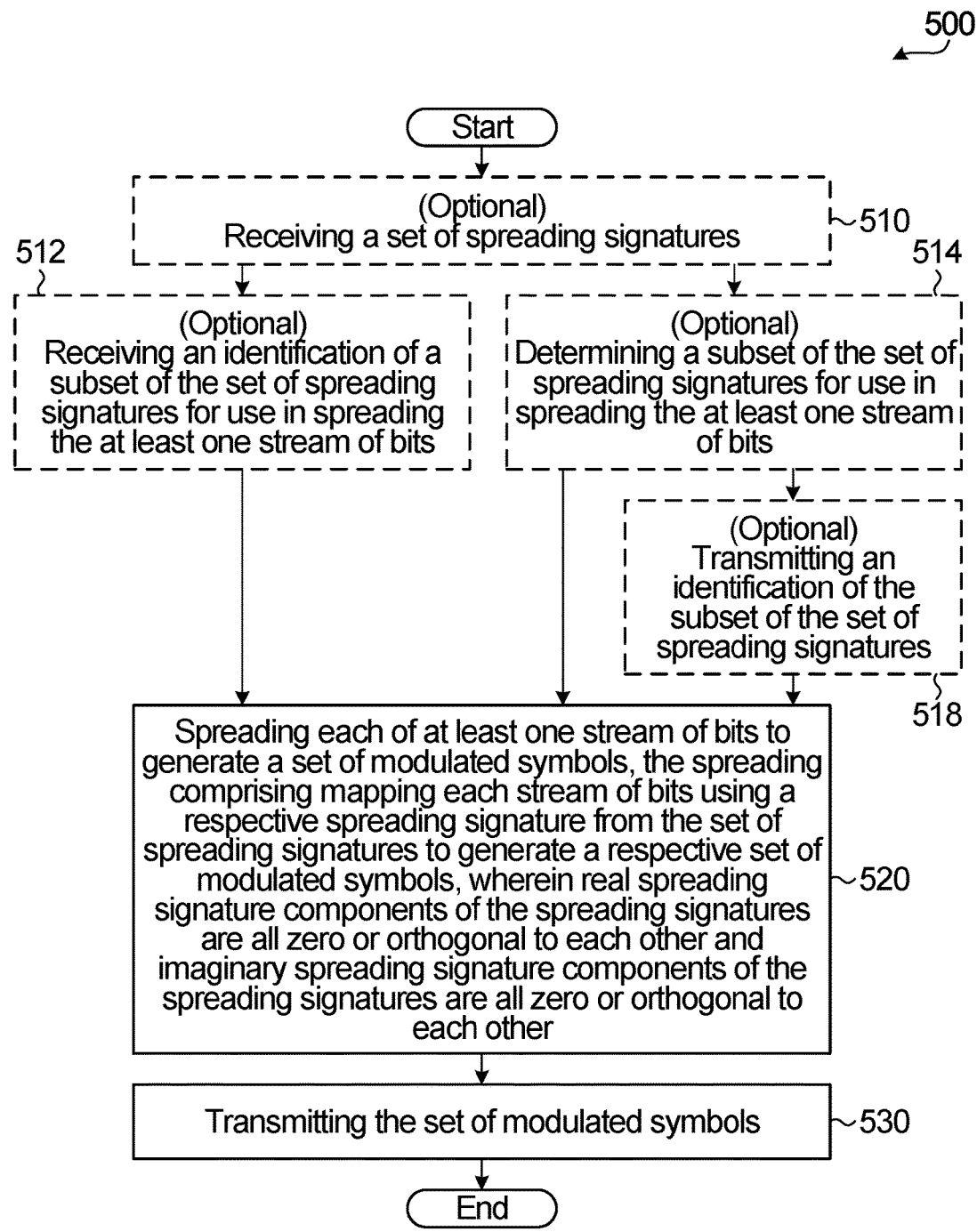
FIG. 5 is a flow diagram of an example method according to an embodiment of the application.

FIG. 5 is a flowchart 500 that illustrates an example method for transmission of a MA signal. The steps of the method may be performed by one or more UEs that are transmitting to a network side receiver. In this particular example, the UEs select a subset of spreading signatures (from a set) or receive from the network an indication of the subset of spreading signatures (as selected by the network) to generate MA signals. In one example, the subset form a matrix.

Step 510 involves the UE optionally receiving a set of spreading signatures. The set of spreading signatures may be one or more pools of signatures. There are various ways that the UE may receive the spreading signatures. The UE can store the set for later use. Such a step may occur prior to the UE being purchased by a user, when the UE accesses the network or they may be updated occasionally after the UE accesses the network.

Step 512 is another optional step that involves the UE receiving an identification of a subset of the set of spreading signatures for use in spreading at least one stream of bits. The network may provide the UE with a list of spreading signatures that the UE should use to generate a modulation and spreading symbol generator used in the modulation ad spreading process. If the network provides the UE with the identification of a subset of the set of spreading signatures, the UE will likely not need to tell the network which spreading signatures the UE will be using and the method will advance to step 530. In one example, the network may have made the determination of the rank of the spreading matrix in order to determine the number of signatures that the UE should select. The network can determine the subset of spreading signatures based on the compatibility rules described herein and possibly based on other factors such as UE identity, parameters of communication including spectral efficiency, transport block size (TBS), modulation and coding scheme (MCS), receiver capability, required KPI, traffic load (which reflects the average number of users connecting the network simultaneously or overloading factor), peak to average power ratio (PAPR), transmission type and an application scenario, and then notify the UE of the subset.

Step 514 is another optional step that involves the UE determining a subset of the set of spreading signatures for use in spreading the at least one stream of bits. Instead of the network determining and notifying the UE of the identification of the subset of the set of spreading signatures such as in step 512, the UE makes the determination itself. In some embodiments, the network may provide the rank for a modulation and spreading matrix that should be used by the UE in selecting the spreading signatures. In other embodiments, the UE may determine the rank for a modulation and spreading matrix that should be used by the UE in selecting the spreading signatures as part of the determination of the subset of the spreading signatures. The UE can determine the subset of spreading signatures for selection from the set of spreading signatures available to the UE based on the compatibility rules described herein and possibly other factors that may include one or more of UE identity, parameters of communication including spectral efficiency, transport block size (TBS), modulation and coding scheme (MCS), receiver capability, required KPI, traffic load (which reflects the average number of users connecting the network simultaneously or overloading factor), peak to average power ratio (PAPR), transmission type and an application scenario. In some embodiments, the UE may transmit a notification of the identification of the subset of the set of spreading signatures that the UE has chosen to the network, in which case the method will advance to step 518. In some embodiments, the UE does not transmit a notification of an identification of the subset of the set of spreading signatures that the UE has chosen to the network, in which case the method will advance to step 520.

A further optional step 518 that may be performed, for example when the UE determines which signatures the UE will use in creating a modulation and spreading symbol generator, involves the UE transmitting an identification of the subset of the set of spreading signatures to the network so the network can more easily decode the modulated symbols.

Step 520 involves the UE spreading each of the at least one stream of bits to generate a set of modulated symbols. The spreading involves mapping each stream of bits using a respective spreading signature from the set of spreading signatures to generate a respective set of modulated symbols. Real signature components of the spreading signatures are orthogonal to each other and imaginary signature components of the spreading signatures are orthogonal to each other.

A further step 530 involves the UE transmitting the set of modulated symbols an MA (e.g. NoMA) signal to the network.

The example method 500 is intended for illustrative purposes. Steps that are identified in FIG. 5 as optional in the flow chart above may or may not be performed in a given implementation of the method. Other embodiments could involve performing the illustrated operations in any of various ways, performing fewer or additional operations, and/or varying the order in which operations are performed. Other variations could be or become apparent to a skilled person based on the present disclosure.

Figure 6:
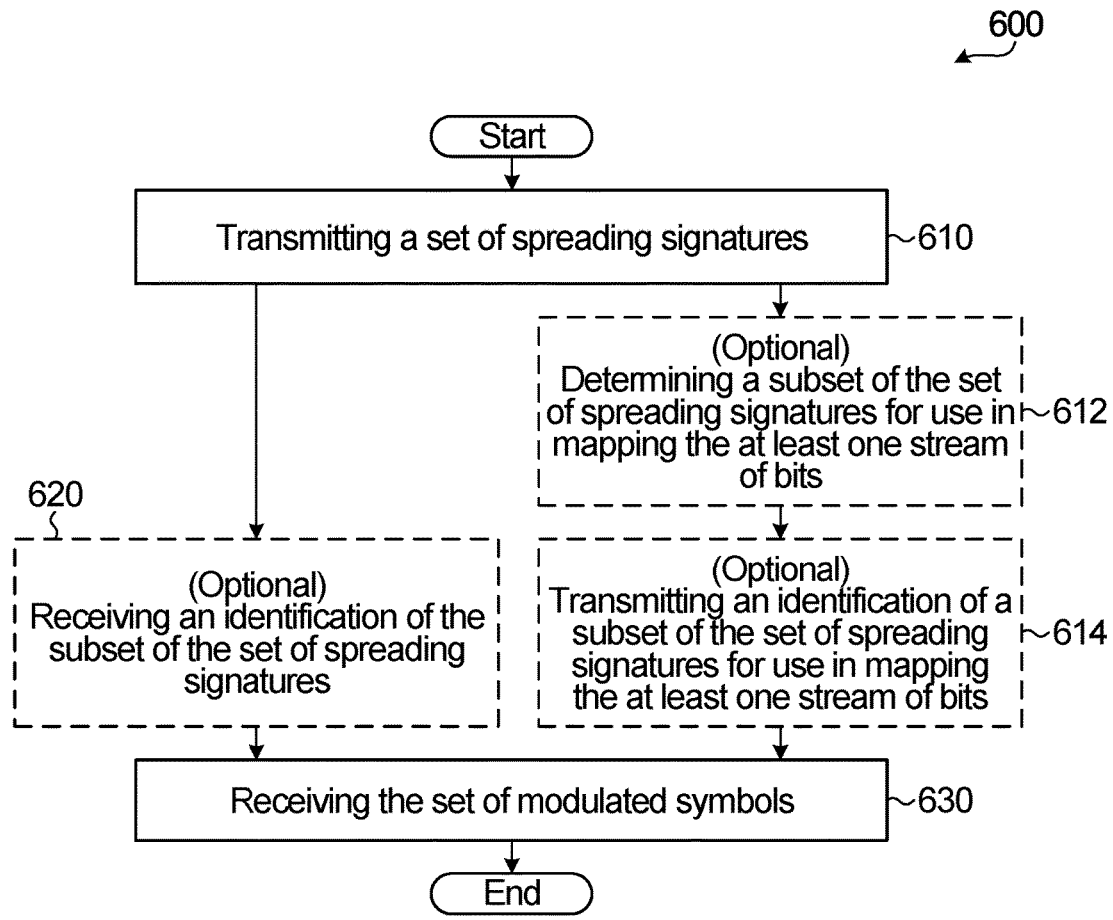
FIG. 6 is a flow diagram of an example method according to an embodiment of the application.

FIG. 6 is a flowchart 600 that illustrates an example method according to the application. The steps of the method may be performed by a network side device that is transmitting to one or more UEs. In this particular example, the network transmits an indication of the subset of spreading signatures (from a set) to the UEs for generating MA signals. In one example, the subset form a matrix.

Step 610 involves the network transmitting a set of spreading signatures. The transmitting may be performed by an access node or base station that is part of the network. The set of spreading signatures may be generated within the network and provided to and stored on a network side device that is part of, or collocated with, the access node or base station. In embodiments where the UE is preconfigured with the set of spreading signatures (e.g. during manufacture), this step may be optional.

Step 612 is an optional step in which, when the network is going to notify the UE which spreading signatures the UE should select from the set of spreading signatures the UE is provided, the network determines a subset of the set of spreading signatures for use in mapping the at least one stream of bits. In such an example, the network may have made the determination of the rank of the spreading matrix in order to determine the number of signatures that the UE should select. The network can determine the subset of spreading signatures based on the compatibility rules described herein and possibly other factors such as UE identity (UE ID), and/or parameters of communication including spectral efficiency, transport block size (TBS), modulation and coding scheme (MCS), receiver capability, required KPI, traffic load (which reflects the average number of users connecting the network simultaneously or overloading factor), peak to average power ratio (PAPR), transmission type and an application scenario, and then notify the UE of the subset.

Step 614 involves, when the network has determined the subset of the set of spreading signatures in step 612, the network transmitting an identification of a subset of the set of spreading signatures for use in mapping at least one stream of bits.

Step 620 is an optional step that involves the network receiving an identification of the subset of the set of spreading signatures that a UE has determined that the UE will be using for spreading. This may occur if the network does not determine which signatures the UE should use for spreading, and the UE decides for itself.

At step 630, the network receives the set of modulated symbols. The device in the network doing the receiving may be a base station or access node of the network that then decodes the modulated symbols.

A particular NoMA codebook may correspond to a particular modulation and spreading symbol sequence generator S. As described with reference to FIG. 4B, S may include the sparsity pattern corresponding to the symbol-to-RE mapping function In some embodiments, a NoMA codebook pool can be generated for use by a UE based on the following steps. The UE can generate a pool of modulation and spreading symbol sequence matrices with different ranks, based on the selection process described above, and the UE can store or be (pre)configured with the pool of modulation and spreading symbol sequence matrices, such that any one of the pool can be selected when desired, without having to generate a particular modulation and spreading symbol sequence matrix when it is desired. For example, each modulation and spreading symbol sequence matrix of the pool could be associated with a set of indices as described above. When the UE decides to use a particular matrix, or is instructed to use a particular matrix by the network, the particular matrix identified based on a set of indices, the UE obtains the matrix associated with the set of indices, for example from the pool of matrices which may have been configured via semi-static (e.g. RRC) signaling or provisioned at manufacture on the UE.

There are many ways to generate and use a pool of signatures. In one example, a first step includes generating a total signature pool P. Two examples of how to generate the pool P are described below.

In a first example, pool P is created by generating signature groups $P_k$ for each group k, k=1, . . . , K. In this case, the signature index can be indicated by (group_Index, Sig_index) where the group_index indicates the index of the group of signatures to be used and Sig_index specifies the Signature (Sig) index within a group of signatures.

In a second example, pool P is created by generating a single signature pool and giving each signature a respective single index value.

In a second step, each NoMA codebook generated for the pool of NoMA codebooks is a collection of signatures. The collection of signatures can be represented as a vector of indices $\{I_1, I_2, \ldots, I_r\}$ where r denotes the rank of the matrix that is the modulation and spreading symbol sequence generator. The rank of the codebook is equal to the number of signatures that are multiplexed in the NoMA signal generation. In some embodiments, the pool of codebook can include NoMA codebooks defined for different ranks.

In a third step, any one or more of scrambling, rotation, power adjustment or phase adjustment can be included in the final generated codebooks to optimize performance. In some embodiments, scrambling, rotation, power adjustment or phase adjustment can be incorporated in the codebook after the first or second steps are performed.

In another embodiment, a (pre)defined NoMA codebook pool (e.g. generated in advance by a network entity or the like) can be used. The NoMA codebook pool can include modulation and spreading symbol sequence matrices with a different number of columns (e.g. ranks), a different number of rows (e.g. corresponding to the spreading length), a different sparsity factor or sparsity pattern, or both, to address different requirements for NoMA transmissions. The predefined modulation and spreading symbol sequence matrices used may be such that they all comply with and/or satisfy the compatibility rules described above. In some implementations, the NoMA codebook pool may contain multiple groups and the matrices in each group may share a common feature, e.g. the same number of columns, the same number of rows, the same sparsity factor and the like. Also, the NoMA codebook pool may correspond only to the non-sparse symbol sequence generator. In this case, one or more separate pools of sparsity patterns may also be provided to the UE which can be used in the generation of a NoMA signal to be transmitted. One example of a NoMA codebook pool to be used in the generation of non-sparse modulated symbol sequence is provided in Table 1. Furthermore, the NoMA codebook pool may correspond to the final symbol sequence generator, incorporating the sparsity pattern if required. In this case, a separate pool of sparsity patterns may not be needed. One example of a NoMA codebook pool to be used in the generation of sparse modulated symbol sequence is provided in Table 2.

In any event, the pool of modulation and spreading symbol sequence matrices can be stored or provisioned in a UE before the UE is purchased, such that any of the modulation and spreading symbol sequence matrices in the pool can be selected when desired. Alternatively, the UE may be configured with a pool through higher layer (RRC) signalling as received from the network (e.g. base station 1670a, 1670b) upon connection to the network or at any other appropriate time. Each modulation and spreading symbol sequence matrix of the pool could be associated with one or more indices as described above. When the UE decides to use a particular matrix, or is instructed to use a particular matrix by the network, the particular matrix identified based on the indices, the UE obtains the matrix associated with the indices.

Once a NoMA codebook pool is generated, defined or configured, any one or more of a scrambling, rotation, power adjustment or phase adjustment operation may be performed at the UE as part of the NoMA signal generation to optimize performance, if desired.

In some embodiments, the UE may be able to select any one of these additional operations which can be implicitly linked to the codebook selected or there can be some signaling indications (e.g. from the network) to signal such changes.

In an implementation where there is codebook or signature hopping, a hopping pattern can be defined for each index element in the Sig_index or a hopping pattern can be based on a defined seed which specifies the hopping pattern over a set of predefined index vectors.

Another aspect of the present disclosure includes providing a method for codebook assignment for a UE. NoMA codebook is basically a set of spreading signatures which form modulation and spreading symbol sequence matrix. In some embodiments, once a NoMA codebook pool is generated or defined, an assignment to a UE can be based on one or more of the following parameters: UE ID; spectral efficiency (SE), transport block size (TBS), modulation and coding scheme (MCS), receiver capability, required KPI, traffic load (which reflects the average number of users connecting the network simultaneously or overloading factor), peak to average power ratio (PAPR), transmission type and an application scenario.

There are many ways to assign a codebook to a UE. For example, the network may signal the codebook or a set of codebooks to use to the UE using one or more indices which may be transmitted in one or a combination of RRC signaling, downlink control information (DCI) signaling, and MAC CE (control element). The signaling may be explicit or alternatively, implicit, for example, using a modulation and coding scheme (MCS) or transport block size (TBS) indication association. Other possibilities exist for the indices and the signaling.

A more specific example of how such a signaling assignment may take place is described below.

In a first step, a codebook group index (group_index) is determined based on one of the target SE, TBS, MCS, traffic load, PAPR, application scenario and receiver capability, or a combination thereof. In a second step, a codebook index (cb_index) within each group is assigned within the codebooks with the same group based on the UE ID. In some embodiments, this assignment can also include a hopping pattern of the indices. In some embodiments, less or more indices can be defined for identification of a particular NoMA codebook In some embodiments, the NoMA codebook pool, including the codebook group, and the codebook indices within each group can be pre-designed and stored in a network device. The codebook group and the codebook indices can be communicated to the UEs through higher layer and or RRC signaling. Once received, the UEs can store the codebook entries. The UEs can select particular codebook entries.

In some embodiments, the network can determine a preferred spreading symbol sequence generator for a given UE to use. When the network is responsible for selecting the signatures to generate the spreading symbol sequence generator and notifying the UE, the network can explicitly signal the codebook index and/or the codebook rank to the UE(s) and the UE can the generate the modulation and spreading symbol sequence generator. This information can be transmitted to the UE through downlink control information (DCI) or RRC signaling.

In some embodiments, the UE can determine a preferred spreading symbol sequence generator for the UE to use. When the UE is responsible for selecting the signatures to generate the spreading symbol sequence generator, the UE can signal information about the generator it has used or intends to use to the network. The information which can include the codebook index, the codebook rank, or both, for example can be explicitly sent to the network or it can be mapped implicitly to a UE specific parameter such as a UE ID or pilot sequence (e.g. DMRS signal). The information can also be implicitly provided to the network by defining a mapping function to map communication parameters including one or more of SE, TBS, MCS, traffic load, PAPR, transmission type, application scenario and receiver capability to the codebook index and/or the codebook rank. For example, for higher SE values (e.g. larger TBS and/or MCS values), higher rank codebooks can be used while for lower SE values (e.g. smaller TBS/MCS values), lower rank codebooks can be used. In some embodiments, a look-up table (LUT) could be used that defines a mapping of the rank to the SE (or TBS/MCS). In some implementations, depending on a receiver algorithm, some codebooks having particular signature feature (e.g. sparse) signatures would be desirable.

In another embodiment, the codebook rank can be mapped to communication parameters like SE, TBS, MCS, traffic load, PAPR, transmission type, application scenario and receiver capability and the codebook index within each rank can be communicated to the UE through RRC signaling or DCI. In other embodiments, the information can be implicitly provided by mapping the information to the UE ID for a given UE.

In some embodiments, the UE can determine a preferred spreading symbol sequence generator matrix (NoMA codebook) for the UE to use. When the UE is responsible for selecting the NoMA codebook, the UE can signal information about the NoMA codebook it has used or intends to use to the network. The information which can include the group index (group_index), the codebook index within the group (cb_index), or both for example, can be explicitly defined for the network or it can be mapped implicitly to a UE specific parameter such as a UE ID or a pilot sequence (e.g. DMRS signal). The information can also be implicitly provided to the network by defining a mapping function to map communication parameters including one or more of SE, TBS, MCS, traffic load, PAPR, transmission type, application scenario and receiver capability to the group index (group_index), the codebook index within the group (cb_index), or both. In some embodiments, a look-up table (LUT) could be used that defines a mapping of communication parameters including one or more of SE, TBS, MCS, traffic load, PAPR, transmission type, application scenario and receiver capability to the group index (group_index), the codebook index within the group (cb_index), or both. In general, these parameters may impose some limitation on the selection of the NoMA codebook to use which can be reflected in the mapping rule. For example, high SE transmission may require codebooks with higher ranks (larger number of columns), or in some implementations, depending on a receiver capability, some codebooks having particular signature feature (e.g. sparse) signatures would be desirable.

In another embodiment, the NoMA codebook group can be mapped to communication parameters like SE, traffic load, application scenario and receiver capability and the codebook index within each group can be communicated to the UE through RRC signaling or DCI. In other embodiments, the information can be implicitly provided by mapping the information to the UE ID for a given UE.

In some embodiments, the NoMA codebook(s) to be used at the UE is (are) determined or selected by the network and the selection is signaled to the UE. The NoMA codebook selection can be indicated to the UE in many different ways. For example, the selection can be indicated using an explicit identification of the NoMA codebook using one or more indices (e.g. the group_index and cb_index) identifying the specific NoMA codebook or matrix to use. In another example, the selection can be indicated using an (explicit) identification of a subset of NoMA codebooks (e.g. the group_index) and the UE selects one NoMA codebook among the codebooks identified in the subset. In this case, the UE selection could be based on one or more of the communication parameters described above (e.g. MCS, TBS, SE, traffic load, application scenario, type, receiver capability, etc.). In yet another example the selection of a particular NoMA codebook or subset of NoMA codebooks to use can be indicated implicitly by transmitting one or more of the communication parameters described above (e.g. MCS, TBS, SE, traffic load, application scenario, type, receiver capability, etc.) to the UE. In this case, a mapping function or a look up table (LUT) can be used by the UE to determine the NoMA codebook or a subset of NoMA codebooks to use.

In another embodiment, the NoMA codebook group index (group_index) can be determined by the network based on parameters like SE, traffic load, application scenario and receiver capability and signaled to the UE (e.g. RRC or DCI) and the NoMA codebook index within the group can be determined by the UE based on a UE ID or a group UE ID. Information indicating the NoMA codebook determined by the UE may be can be communicated back to the network or it can be implicitly known by the network through a LUT and a mapping function between the UE ID (or group UE ID) and the NoMA codebook index.

Figure 7A:
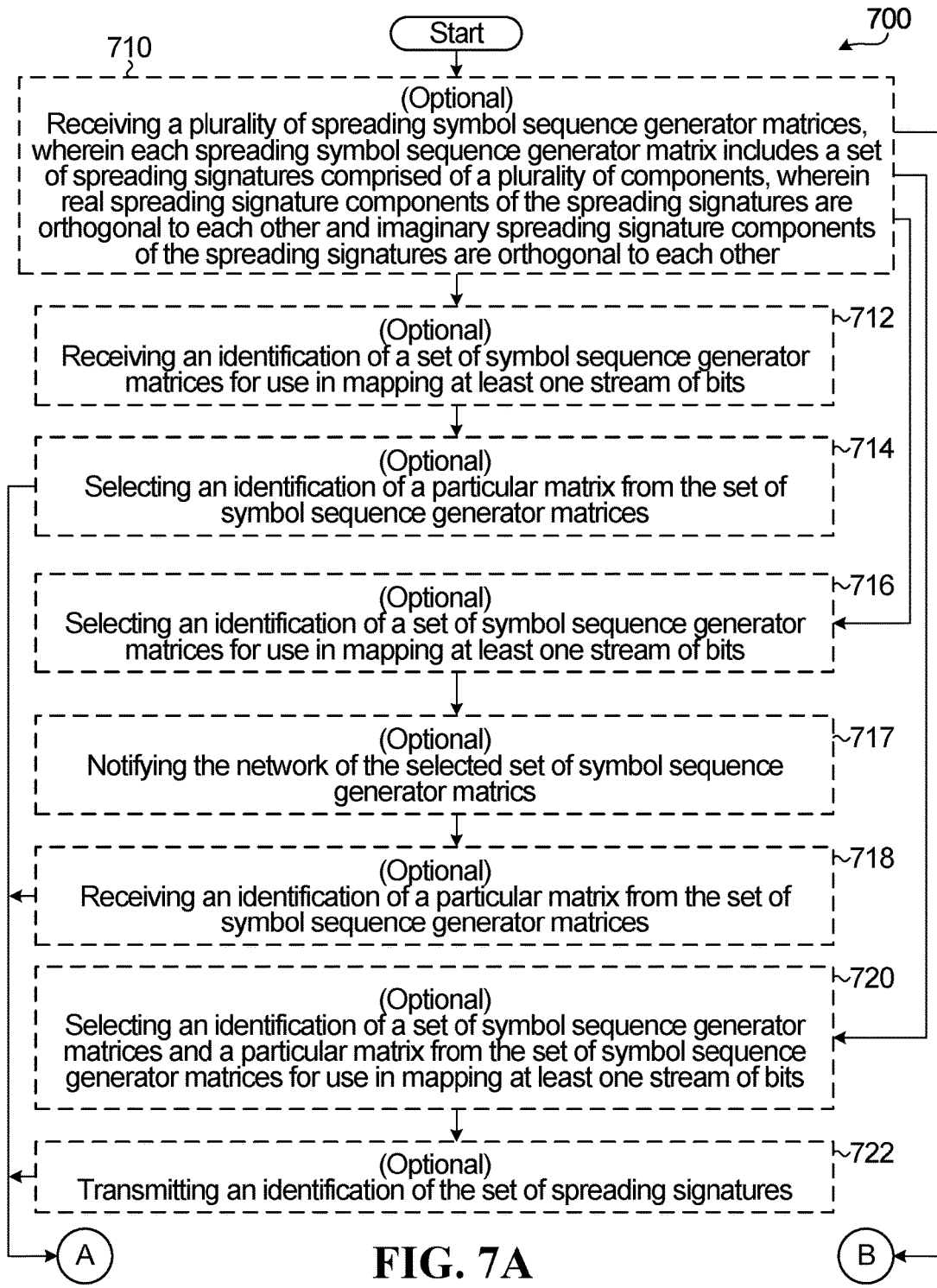
FIGS. 7A and 7B are a flow diagram of an example method according to an embodiment of the application.
Figure 7B:
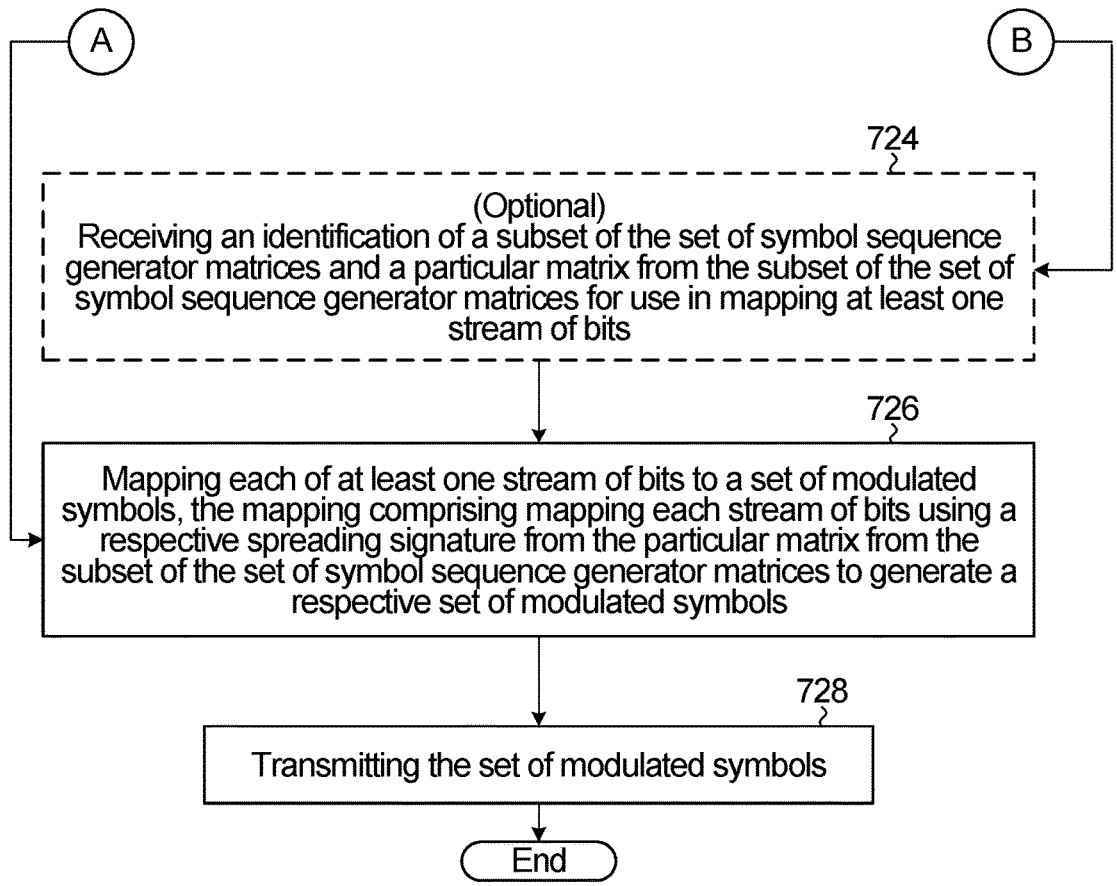

FIGS. 7A and 7B together form a flowchart 700 that illustrates another example method for transmission of a MA signal. The steps of the method may be performed by one or more UEs that are transmitting to a network side receiver. In this particular example, the UEs select a particular set of the spreading signatures (out of a plurality of sets) or receive from the network an indication of the set of the spreading signatures (as selected by the network) to generate MA signals. In one example, the set is a matrix and a plurality of sets is plurality of matrices.

Step 710, which is an optional step, involves the UE receiving a plurality of spreading symbol sequence generator matrices. Each spreading symbol sequence generator matrix includes a set of spreading signatures comprised of a plurality of components, wherein real spreading signature components of the spreading signatures are orthogonal to each other and imaginary spreading signature components of the spreading signatures are orthogonal to each other. There are various ways that the UE may receive the sets of spreading signatures. The UE can store the sets for later use. Such a step may occur prior to the UE being purchased by a user, when the UE accesses the network or they may be updated occasionally after the UE accesses the network. In the case that a plurality of spreading symbol sequence generator matrices are pre-designed and pre-stored in the UE before purchase, step 710 is not mandatory.

Subsequent to step 710 there are four optional paths that will be detailed below. Generally, a first of the four paths can be considered to involve the UE receiving an identification of a set of spreading matrices from a plurality of sets of spreading matrices available to the UE and then the UE selecting a particular spreading matrix from the set. A second of the four paths can be considered to involve the UE making a selection of a set of spreading matrices from a plurality of sets of spreading matrices available to the UE and notifying the network device. Then the UE receives an identification of a particular spreading matrix from the network from the UE selected set. A third of the four paths can be considered to involve the UE making a determination of both a set of spreading matrices (from a plurality of sets of spreading matrices available to the UE) and a particular matrix of the set. The UE may provide that information to the network, so the network is aware of the manner in which the symbols were modulated and spread. A fourth of the four paths can be considered to involve the UE receiving an identification of both a set of spreading matrices (from a plurality of subsets of spreading matrices available to the UE) and a particular matrix of the set of matrices. The manner in which the set of spreading matrices and a particular matrix of the set of matrices are selected will be described in further detail in the examples below.

In the first path, step 712 is an optional step that involves the UE receiving an identification of a set of symbol sequence generator matrices from a plurality of sets of symbol sequence generator matrices for use in mapping at least one stream of bits.

Still in the first path, step 714 is an optional step that involves the UE selecting an identification of a particular matrix from the set of symbol sequence generator matrices.

There are multiple ways in which the network equipment can determine the set of spreading matrices. For example, in a first embodiment, information that may be used by the network equipment in selecting the set of spreading matrices may include average traffic load (number of users simultaneously accessing the network), transmission type (grant-free or grant-based or application type like uRLLC or mMTC) as well as receiver capability. Once the set of spreading matrices, possibly in the form of a group index, is indicated by the network and communicated to the UEs, the selection of the particular spreading matrix from the subset of spreading matrices, possibly identified by a codebook index, can be based on the UE ID (for example for grant-free transmission) as well as transmission block size (TBS), modulation and coding scheme (MCS), PAPR and transmission type. The codebook index can be explicitly signaled to the network using DCI signaling for example, or it can be implicit in some other information like DMRS.

In a second embodiment, the selection of a set of spreading matrices is based on the rank of the matrices (number of columns). In such a scenario the rank can be determined based on the SINR measurement, transmission type, TBS, SE and MCS which can be provided by UEs through dynamic signaling, for example using DCI, or higher layer signaling. Once the set of spreading matrices is indicated by the network and communicated to the UEs, the selection of the particular spreading matrix from the set of spreading matrices can be based on the UE ID (for example for grant-free transmission). The codebook index can be explicitly signaled to the network using RRC signaling for example, or it can be implicit in some other information like DMRS.

In the second path, step 716 is an optional step that involves the UE selecting an identification of a set of symbol sequence generator matrices from a plurality of sets of symbol sequence generator matrices for use in mapping at least one stream of bits.

Still in the second path, at step 717, the UE can notify the network of the set of symbol sequence generator matrices selected by the UE. Step 718 is an optional step that involves the UE receiving an identification of a particular matrix from the set of symbol sequence generator matrices.

In the third path, step 720 is an optional step that involves the UE selecting an identification of a set of symbol sequence generator matrices from a plurality of sets of symbol sequence generator matrices and a particular matrix from the set of symbol sequence generator matrices for use in mapping at least one stream of bits.

Still in the third path, in some embodiments, in step 722 the UE may transmit an identification of the set of spreading signature to the network equipment In the fourth path, step 724 is an optional step that involves the UE receiving an identification of a set of symbol sequence generator matrices and a particular matrix from the set of symbol sequence generator matrices for use in mapping at least one stream of bits.

The step after any of 714, 718, 720, 722 or 724 involves the UE spreading each of at least one stream of bits to generate a set of modulated symbols, the spreading comprising mapping each stream of bits to generate a set of modulated symbols using the spreading signatures of the particular matrix selected from the set of symbol sequence generator matrices.

A further step 728 involves the UE transmitting the set of modulated symbols in an MA signal to the network.

The example method 700 is intended for illustrative purposes. Steps that are identified in FIGS. 7A and 7B as optional in the flow chart may or may not be performed in a given implementation of the method. Other embodiments could involve performing the illustrated operations in any of various ways, performing fewer or additional operations, and/or varying the order in which operations are performed. Other variations could be or become apparent to a skilled person based on the present disclosure.

Figure 8:
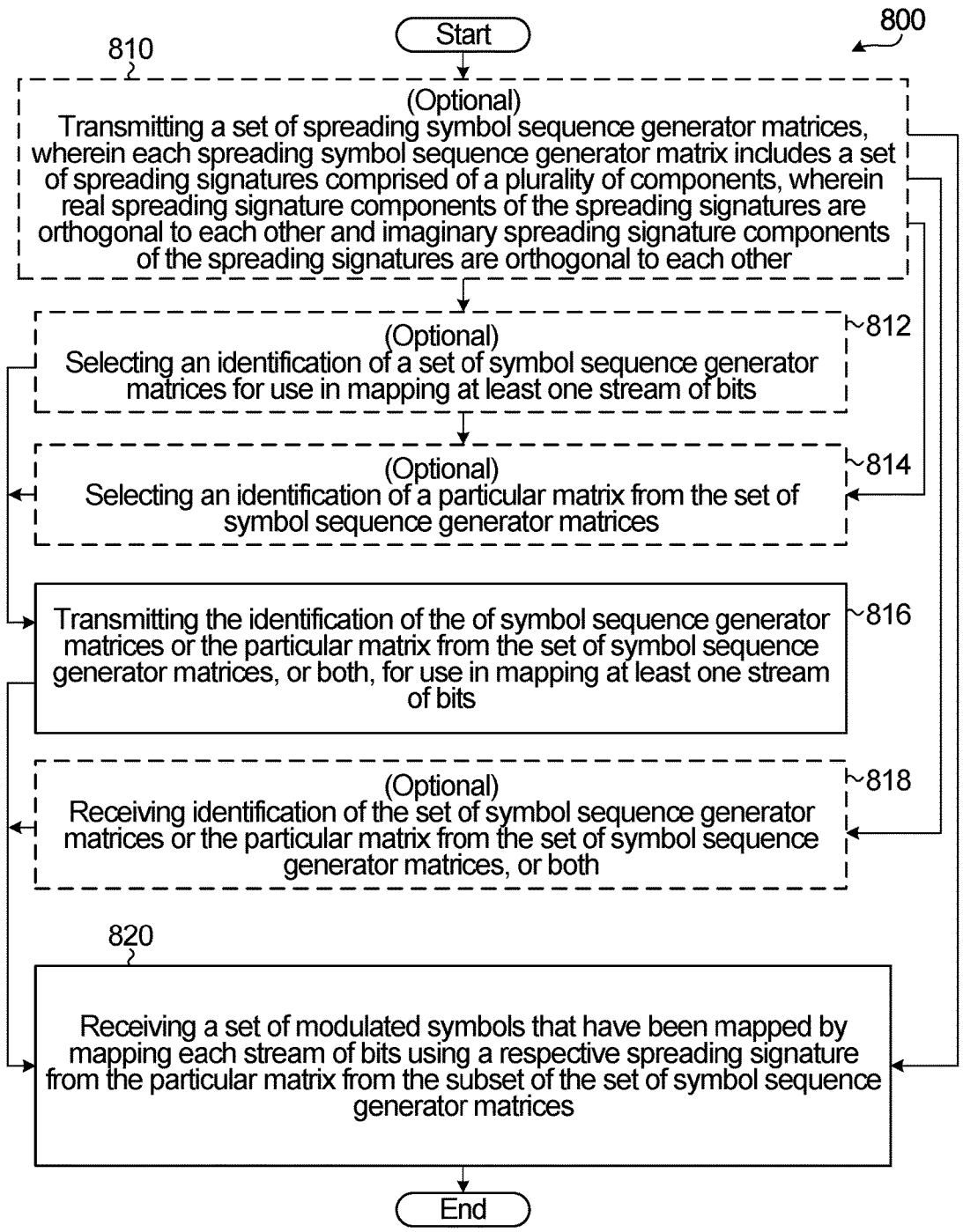
FIG. 8 is a flow diagram of an example method according to an embodiment of the application.

FIG. 8 is a flowchart 800 that illustrates another example method according to the application. The steps of the method may be performed by a network side device that is transmitting to one or more UEs. These steps are generally complementary to the UE steps described above in FIGS. 7A and 7B.

Step 810 is an optional step which involves the network transmitting a set of spreading symbol sequence generator matrices, wherein each spreading symbol sequence generator matrix includes a set of spreading signatures comprised of a plurality of components, wherein real spreading signature components of the spreading signatures are orthogonal to each other and imaginary spreading signature components of the spreading signatures are orthogonal to each other. The set of spreading symbol sequence generator matrices may be generated within the network and provided to and stored on a network side device that is part of, or collocated with, the access node or base station. In some embodiments, a set of spreading symbol sequence generator matrices can be pre-designed and pre-stored in the UEs before purchase and therefore step 810 is not mandatory.

Step 812 is an optional step in which, the network selects an identification of a set of symbol sequence generator matrices for use in mapping at least one stream of bits. The manner that the network selects or determines the set of spreading matrices in step 812 may be as described above regarding the two example embodiments pertain to the first path of FIGS. 7A and 7B.

In some embodiments, as shown in step 814, the network may also select an identification of a particular matrix from the set of the set of symbol sequence generator matrices.

In a further step 816, the network transmits the identification of the set of symbol sequence generator matrices or the particular matrix from the set of symbol sequence generator matrices, or both, for use in mapping at least one stream of bits.

Step 818 is an optional step of a different path in which the network receives identification of a set of symbol sequence generator matrices or the particular matrix from the set of symbol sequence generator matrices, or both.

The step after any of 816 or 818 involves the network receiving a set of modulated symbols that have been spread by the UE, the spreading comprising mapping each stream of bits using a respective spreading signature from the particular matrix from the subset of the set of symbol sequence generator matrices.

FIG. 9 is a block diagram of an example apparatus 900 for transmission of a MA signal. The example apparatus 900 may be a UE and thus have various elements that would normally be a part of such an apparatus, such as a key pad, display screen, speaker, microphone, etc. The example apparatus 900 includes a processor 910 and a processor readable storage device 920. The processor readable storage device 920 has stored thereon processor executable instructions 930 that when executed by the processor 910 cause the processor 910 to perform a method consistent with the methods described above.

FIG. 10 is a block diagram of an example network side apparatus 1000 for transmission of a MA signal. Such a network side apparatus may include physical structure for performing other network side tasks and be located anywhere within the network that allows the device to operate accordingly. The example apparatus 1000 includes a processor 1010 and a processor readable storage device 1020. The processor readable storage device 1020 has stored thereon processor executable instructions 1030 that when executed by the processor 1010 cause the processor 1010 to perform a method consistent with the methods described above.

FIG. 11 is a block diagram of an example apparatus 1100 for receiving a MA signal. The example apparatus may be a network side device capable of receiving and decoding the MA signal. Such a network side apparatus may include physical structure for performing other network side tasks and be located anywhere within the network that allows the device to operate accordingly. The example apparatus 1100 includes a processor 1110 and a processor readable storage device 1120. The processor readable storage device 1120 has stored thereon processor executable instructions 1130 that when executed by the processor 1110 cause the processor 1110 to implement a method for receiving one or more MA signals form one or more transmitters and decode the one or more MA signals.

In some embodiments, the processor in FIGS. 9, 10 and 11 may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

Some embodiments of the disclosure may allow selection of appropriate MA schemes for particular application scenarios, depending on a required key performance indicator (KPI) based on the defined processing operators.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

We claim:

1. A method for a user equipment (UE) for transmission of a multiple access (MA) signal comprising:
   mapping each of at least one stream of bits to a set of modulated symbols using a set of spreading signatures, wherein the set of spreading signatures is one of a plurality of sets of spreading signatures, wherein for each set of spreading signatures in the plurality of sets, each spreading signature in the set of spreading signatures comprises complex values having a real spreading signature component and an imaginary spreading signature component and real spreading signature components of the spreading signatures in each set are orthogonal to each other and imaginary spreading signature components of the spreading signatures in each set are orthogonal to each other;
   transmitting the set of modulated symbols as an MA signal.

2. The method of claim 1 further comprising receiving an identification of the set of spreading signatures for use in mapping the at least one stream of bits.

3. The method of claim 2, wherein the identification of the set of spreading signatures is one of:
   a spreading signature set index that identifies the spreading signature set from the plurality of sets of spreading signatures;
   a first index that identifies a group of sets of spreading signatures from the plurality of sets of spreading signatures;
   a second index that identifies a spreading signature set from the group of sets of spreading signatures; or
   a first index that identifies a group of sets of spreading signatures from the plurality of sets of spreading signatures and a second index that identifies a spreading signature set from the group of sets of spreading signatures.

4. The method of claim 3, wherein subsequent to receiving the first index that identifies the group of sets of spreading signatures, selecting the spreading signature set from the group of sets of spreading signatures.

5. The method of claim 2, wherein identification of the set of spreading signatures is received in a semi-static or dynamic signaling message.

6. The method of claim 1 further comprising:
   determining the set of spreading signatures to be used for mapping the at least one stream of bits.

7. The method of claim 6 further comprising transmitting an identification of the set of spreading signatures determined to another device.

8. The method of claim 6 wherein determining the set of spreading signatures is based on at least one of:
   an identifier for the UE;
   a peak to average power ratio (PAPR);
   an application type;
   a transmission type;
   a transport block size (TBS);
   a spectral efficiency (SE);
   a modulation and coding scheme (MCS);
   a receiver capability; and
   a key performance indicator (KPI).

9. The method of claim 1, wherein, for each set of spreading signatures in the plurality of sets,
   real spreading signature components of the spreading signatures in the set are real valued components of the spreading signatures and an inner product of the real spreading signature components of two spreading signatures in the set are equal to zero; and
   imaginary spreading signature components of the spreading signatures in the set are imaginary valued components of the spreading signatures and an inner product of the imaginary spreading signature components of two spreading signatures in the set are equal to zero.

10. The method of claim 1, wherein the set of spreading signatures used for the mapping form a spreading signature matrix and wherein mapping comprises a matrix multiplication of the at least one stream of bits, or a modulated version thereof, and the spreading signature matrix.

11. The method of claim 1 further comprising mapping the sets of modulated symbols to one or more resource elements prior to transmission.

12. The method of claim 11, wherein for a spreading signature matrix S that is a combination of a matrix $S_r$, which is a matrix of the real components of the spreading signature matrix S, and a matrix $S_i$, which is a matrix of the imaginary components of the spreading signature matrix S, selecting the subset of spreading signatures so that columns of $S_r$ are orthogonal to each other and columns of $S_i$ are orthogonal to each other.

13. A user equipment (UE) comprising:
   a processor; and
   a computer readable storage medium storing programming instructions for execution by the processor, the programming including instructions to:
      mapping each of at least one stream of bits to a set of modulated symbols using a set of spreading signatures, wherein the set of spreading signatures is one of a plurality of sets of spreading signatures, wherein for each set of spreading signatures in the plurality of sets, each spreading signature in the set of spreading signatures comprises complex values having a real spreading signature component and an imaginary spreading signature component and real spreading signature components of the spreading signatures in each set are orthogonal to each other and imaginary spreading signature components of the spreading signatures in each set are orthogonal to each other;
      transmit the set of modulated symbols as an MA signal.

14. A method comprising:
 transmitting an identification of a set of spreading signatures for use in mapping each of at least one stream of bits to a set of modulated symbols using a set of spreading signatures, wherein the set of spreading signatures is one of a plurality of sets of spreading signatures, wherein for each set of spreading signatures in the plurality of sets, each spreading signature in the set of spreading signatures comprises complex values having a real spreading signature component and an imaginary spreading signature component and real spreading signature components of the spreading signatures in each set are orthogonal to each other and imaginary spreading signature components of the spreading signatures in each set are orthogonal to each other; and
 receiving the set of modulated symbols.

15. The method of claim 14 further comprising:
 determining the set of spreading signatures from the plurality of sets of spreading signatures; and
 associating the set of spreading signatures with the identification to be transmitted.

16. The method of claim 15, wherein determining the set of spreading signatures is based on at least one of:
 an average traffic load;
 a transmission type;
 a peak to average power ratio (PAPR);
 an application type;
 a key performance indicator (KPI);
 a receiver capability; and
 a rank of the set of spreading signatures.

17. The method of claim 15, wherein determining the set of spreading signatures is based on at least one of:
 an identifier for a UE;
 a peak to average power ratio (PAPR);
 an application type;
 a transmission type;
 a transport block size (TBS);
 a spectral efficiency (SE);
 a modulation and coding scheme (MCS);
 a receiver capability; and
 a key performance indicator (KPI).

18. The method of claim 14 further comprising transmitting one or more sets of spreading signatures to the UE, a maximum number of the sets of spreading signatures including a number equal to the plurality of sets of spreading signatures.

19. The method of claim 14, wherein the identification of the set of spreading signatures is one of:
 a spreading signature set index that identifies the spreading signature set from the plurality of sets of spreading signatures;
 a first index that identifies a group of sets of spreading signatures from the plurality of sets of spreading signatures;
 a second index that identifies a spreading signature set from the group of sets of spreading signatures; or
 a first index that identifies a group of sets of spreading signatures from the plurality of sets of spreading signatures and a second index that identifies a spreading signature set from the group of sets of spreading signatures.

20. The method of claim 14 further comprising receiving an identification of the set of spreading signatures for use in spreading at least one stream of bits.

21. A network equipment comprising:
 a processor; and
 a computer readable storage medium storing programming instructions for execution by the processor, the programming including instructions to:
  transmit an identification of a set of spreading signatures for use in mapping each of at least one stream of bits to a set of modulated symbols using a set of spreading signatures, wherein the set of spreading signatures is one of a plurality of sets of spreading signatures, wherein for each set of spreading signatures in the plurality of sets, each spreading signature in the set of spreading signatures comprises complex values having a real spreading signature component and an imaginary spreading signature component and real spreading signature components of the spreading signatures in each set are orthogonal to each other and imaginary spreading signature components of the spreading signatures in each set are orthogonal to each other; and
  receive the set of modulated symbols.

* * * * *